(12) United States Patent
Saleem-Uddin et al.

(10) Patent No.: US 12,544,460 B2
(45) Date of Patent: Feb. 10, 2026

(54) AAV GENE THERAPY FOR TREATING NEPHROTIC SYNDROME

(71) Applicant: The University of Bristol, Bristol (GB)

(72) Inventors: Moin Ahson Saleem-Uddin, Bristol (GB); Gavin Iain Welsh, Bristol (GB)

(73) Assignee: The University of Bristol, Bristol (GB)

( * ) Notice: Subject to any disclaimer, the term of this patent is extended or adjusted under 35 U.S.C. 154(b) by 1209 days.

(21) Appl. No.: 17/422,739

(22) PCT Filed: Jan. 17, 2020

(86) PCT No.: PCT/GB2020/050097
§ 371 (c)(1),
(2) Date: Jul. 13, 2021

(87) PCT Pub. No.: WO2020/148548
PCT Pub. Date: Jul. 23, 2020

(65) Prior Publication Data
US 2022/0125950 A1    Apr. 28, 2022

(30) Foreign Application Priority Data
Jan. 18, 2019 (GB) .................................... 1900702

(51) Int. Cl.
*C12N 15/86* (2006.01)
*A61K 48/00* (2006.01)

(52) U.S. Cl.
CPC .......... *A61K 48/0058* (2013.01); *C12N 15/86* (2013.01); *C12N 2750/14143* (2013.01); *C12N 2830/008* (2013.01); *C12N 2830/48* (2013.01); *C12N 2830/50* (2013.01)

(58) Field of Classification Search
None
See application file for complete search history.

(56) References Cited

U.S. PATENT DOCUMENTS

| | | | |
|---|---|---|---|
| 5,122,458 A | 6/1992 | Post et al. | |
| 2003/0152954 A1 | 8/2003 | Antignac et al. | |
| 2011/0268712 A1 | 11/2011 | Lapidot et al. | |
| 2016/0324982 A1 | 11/2016 | Scadden et al. | |
| 2018/0353619 A1 | 12/2018 | Michalakis et al. | |
| 2022/0125950 A1 | 4/2022 | Saleem-Uddin et al. | |

FOREIGN PATENT DOCUMENTS

| | | |
|---|---|---|
| CN | 105745326 A | 7/2016 |
| CN | 108368164 A | 8/2018 |
| EP | 4273243 A1 | 11/2023 |
| JP | 2017506521 A | 3/2017 |
| JP | 2020506705 A | 3/2020 |
| WO | WO-200153347 A2 | 7/2001 |
| WO | WO-2003082305 A1 | 10/2003 |
| WO | WO-2007125723 A1 | 11/2007 |
| WO | WO-2015060722 A1 | 4/2015 |
| WO | WO-2015/121501 A1 | 8/2015 |
| WO | WO-2017075619 A1 | 5/2017 |
| WO | WO-2017078100 A1 | 5/2017 |
| WO | WO-2017144080 A1 | 8/2017 |
| WO | WO-2018/033254 A2 | 2/2018 |
| WO | WO-2018144709 A2 | 8/2018 |
| WO | WO-2020/148548 A1 | 7/2020 |

OTHER PUBLICATIONS

Xu, Zhi-Li, et al. "Woodchuck hepatitis virus post-transcriptional regulation element enhances transgene expression from adenovirus vectors." Biochimica Et Biophysica Acta (BBA)—General Subjects 1621.3 (2003): 266-271. (Year: 2003).*
Chen, Sifeng, et al. "Gene delivery in renal tubular epithelial cells using recombinant adeno-associated viral vectors." Journal of the American Society of Nephrology 14.4 (2003): 947-958. (Year: 2003).*
Rheault et al., The genetics of nephrotic syndrome, J Pediatr Genet., 5:15-24 (2016).
Ikeda et al., Efficient gene transfer to kidney mesenchymal cells using a synthetic adeno-associated viral vector, J Am Soc Neph, 29:2287-2297 (Sep. 2018).
Makrides, Vectors for gene expression in mammalian cells, New Comp Biochem, 38:9-26 (2003).
Choi et al., Optimization of AAV expression cassettes to improve packaging capacity and transgene expression in neurons, Mol Brain, 7:1 (Jul. 2017).
Zhang et al., "Research progress of monogenic mutations in the pathogenesis of steroid-resistant nephrotic syndrome", Journal of Rare Disease Research, 2024, vol. 3 issue 1, pp. 18-29.
Ding et al., "Adeno-Associated Virus Vector Gene Therapy Ameliorates Nephrosis in a Podocin-deficient Mouse Model of Nephrotic Syndrome", UK Kidney Week Virtual, Abstract (2019).
Ding, "Investigating adeno-associated virus as a vector for gene therapy for steroid-resistant nephrotic syndrome," British Library EThOS, Abstract (2019).
Dong et al., "Towards an understanding of kidney disease associated with WT1 mutations," Kidney International, 88:684-690 (2015).
Kawai et al., "Transient Expression of WHIM-Type Mutant CXCR4 Human Hematopoietic Stem Cells Mediated by Integration Defective Lentivirus Vector Enhance Engraftment in the NOD/SCID Mouse Xenograft Model," Molecular Therapy, 15, Supplement 1, p. S121-S122 (2007).
Kestilä et al., "Positionally cloned gene for a novel glomerular protein-nephrin-is mutated in congenital nephrotic syndrome," Mol Cell, 1:575-582 (1998).

(Continued)

*Primary Examiner* — Tracy Vivlemore
*Assistant Examiner* — Fatimah Khalaf Matalkah
(74) *Attorney, Agent, or Firm* — MARSHALL, GERSTEIN & BORUN LLP

(57) ABSTRACT

The present invention provides an adeno-associated virus (AAV) vector gene therapy for use in treating a monogenic form of nephrotic syndrome, wherein the AAV vector comprises a NS-associated transgene and minimal nephrin promoter NPHIS1 or podocin promoter NPHIS2.

17 Claims, 19 Drawing Sheets

Specification includes a Sequence Listing.

(56) References Cited

OTHER PUBLICATIONS

Needleman et al., "A General Method Applicable to the Search for Similarities in the Amino Acid Sequence of Two Proteins," Journal of Molecular Biology, 48(3):443-453 (1970).
Takeda et al., Nephron Experimental Nephrology 96(4):e119-e126 (2004).
Bierzynska et al., Genomic and clinical profiling of a national nephrotic syndrome cohort advocates a precision medicine approach to disease management, Kidney International., Apr. 1, 2017, vol. 91, No. 4, pp. 937-947 XP055677142.
Caridi et al., NPHS2 (Podocin) Mutations in Nephrotic Syndrome. Clinical Spectrum and Fine Mechanisms, Pediatric Research, vol. 57, No. 5, Pt. 2:54R-61R (2005).
Kemper et al., Treatment of Genetic Forms of Nephrotic Syndrome, Frontiers in Pediatrics, vol. 6, article 72 (Mar. 2018).
Luo et al., Hepatorenal correction in murine glycogen storage disease type I with a double-stranded adeno-associated virus vector, Mol Ther, vol. 19, pp. 1961-1970 (Nov. 2011).
Moeller et al., Two gene fragments that direct podocyte-specific expression in transgenic mice, J Am Soc Nephrol, 13(6):1561-7 (Jun. 2002).
Perocheau et al., Age-Related Seroprevalence of Antibodies Against AAV-LK03 in a UK Population Cohort, Hum Gene Ther, 30(1):79-87 (Jan. 2018).
Picconi et al., Kidney-specific expression of GFP by in-utero delivery of pseudotyped adeno-associated virus 9, Molecular Therapy. Methods & Clinical Development, 1:14014 (May 2014).
Rocca et al., rAAV9 combined with renal vein injection is optimal for kidney-targeted gene delivery: conclusion of a comparative study, Gene therapy, 21(6):618-28 (Jun. 2014).
Schambach et al., Woodchuck hepatitis virus post-transcriptional regulatory element deleted from X protein and promoter sequences enhances retroviral vector titer and expression, Gene Therapy, 13(7):641-5 (Apr. 2006).
Schievenbusch et al., Combined Paracrine and Endocrine AAV9 mediated Expression of Hepatocyte Growth Factor for the Treatment of Renal Fibrosis, Molecular Therapy, 18(7):1302-9 (Jul. 2010).
Tabatabaeifar et al., An inducible mouse model of podocin-mutation-related nephrotic syndrome, PLOS One, 12(10):e0186574 (Oct. 2017).
Van Der Wouden et al., Approaches and methods in gene therapy for kidney disease, J Pharmacol Toxicol Methods, 50(1):13-24 (Jul.-Aug. 2004).
International Application No. PCT/GB2020/050097, Invitation to Pay Additional Fees, mailed Mar. 30, 2020.
International Application No. PCT/GB2020/050097, International Search Report and Written Opinion, mailed Jun. 23, 2020.
Lisowski et al., Selection and evaluation of clinically relevant AAV variants in a xenograft liver model, Nature, 506(7488):382-6 (2014).
Ding et al., Adeno-associated virus gene therapy prevents progression of kidney disease in genetic human and mouse models of nephrotic syndrome, EMBASE, Jan. 2019.
Benoit et al., Hereditary nephrotic syndrome: a systematic approach for genetic testing and a review of associated podocyte gene mutations, Pediatric Nephrology, 25(9):1621-32 (2010).
Japanese Patent Application No. 2024-167091, Notice of Reasons for Rejection, mailed Oct. 7, 2025.

\* cited by examiner

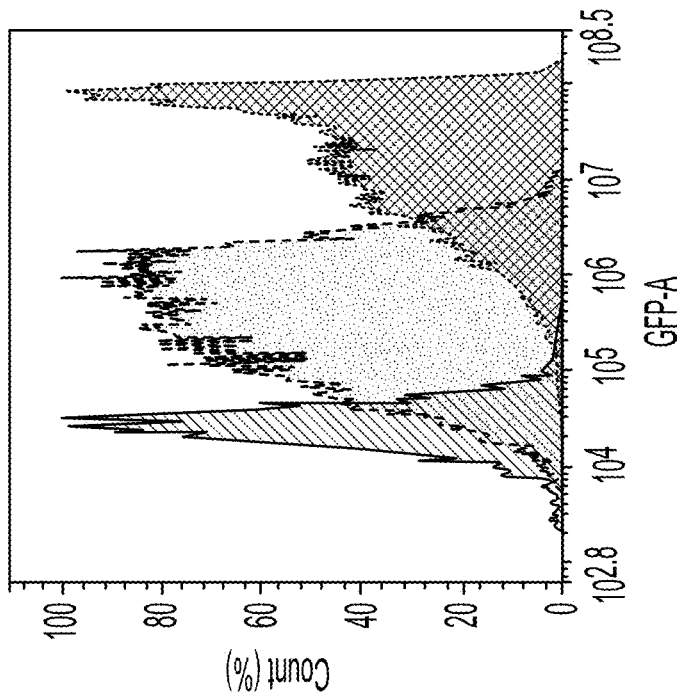
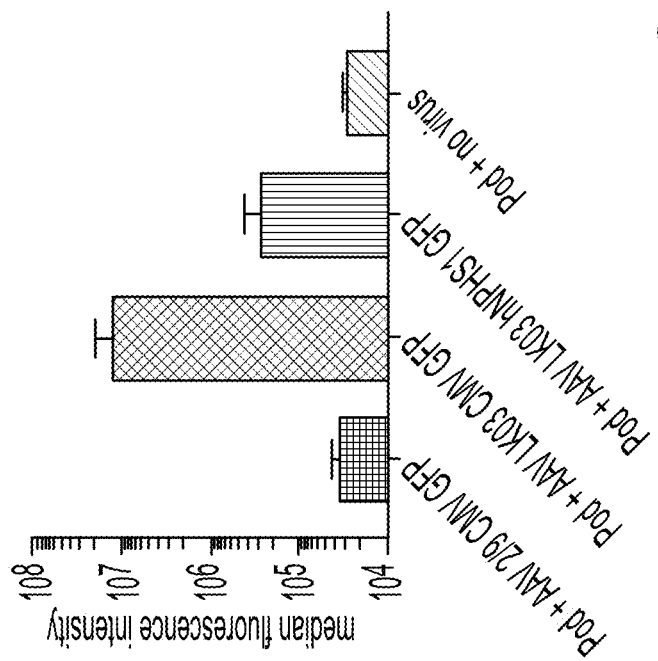
FIG. 3F

Cacctgaggtcaggagttcgagaccagcgtggccaacatgatgaaacccgtctctagtaaaaatacaaaaat
tagccaggcatggtgctatatacctgtagcaccagctacttgggagacagaggtgggagaattacttgaacctg
ggaggttcaagccatgggaggtggaagttgcagtgagccgagatgccactgcactccagcctgagcaacaga
gcaagactatctcaagaaaagaaagaaagaaagaaagagacttgccaaggtcatgtatcagggcaaggaag
agctgggggcccagctggctgctcccctgctgagctgggagaccaccttgatctgacttctcccatcttcccagc
ctaagccaggccctggggtcacggaggctggggaggcaccgaggaacgcgcctggcatgtgctgacagggg
attttatgctccagctgggccagctgggaggagcctgctgggcagaggccagagctgggggctggaaggta
cctgggggaggttgcactgtgagaatgagctcaagctgggtcagagagcagggctgactctgccagtgcctgc
atcagcctcatcgctctcctaggctcctggcctgctggactctgggctgcaggtccttcttgaaaggctgtgagta
gtgagacaaggagcaggagtgaggggtggcaggagagaagatagagattgagagagagagagagagagag
acagagagaggaagagacagagacaaaaggagagagaacggcttagacaaggagagaaagatggaaa
gataaagagactgggcgcagtggctcacgcctgtaatcccaacacttggggaggccaaggtgggaggatggc
ttgaaggaaagagtctgagatcaacctggccaacatagtgagaccccgtctctaaaaaaaaaagaaaaaaa
aaagaaaaaagaaaaaaaagttttttaaagagacagagaaagagactcagagattgagactgagagcaag
acagagagagatactcacagggaagaggggaagaggaaaacgagaaagggaggagagtaacggaaagag
ataaaaagaaaagcaggtggcagagacacacagagagggacccagagaaagccagacagacgcaggtg
gctggcagcgggcgctgtggggtcacagtaggggggacctgtg

FIG. 5

Atggagaggagggcgcggagctcctccagggagtccgcggcgaggcggcaggactccgcacaaggaga
acaagagggcaaaggccgagaggagcggcggggccgcgggcgccaggaggctgggcccgagccgtcgg
gctccggacgggcggggaccccgggggagccccgagcgcccgccgccacggtggtggacgtggatgaggtc
cgaggctccggcgaggagggcaccgaggtggtggcgctgttggagagcgagcggcccgaggaaggtaccaa
atcctccggcttagggggcctgtgagtggcttcttgtcctcatttccctgctcttcatcatcatgaccttcccttttcc
atctggttctgcgtaaaggttgtacaagagtatgaaagagtaattatattccgactgggacatctgcttcctgga
agagccaaaggccctggtcttttctttttttgccctgcctggatacctaccacaaggttgacttcgtctccaaac
tctggagatacctttcatgagatcgtgaccaaagacatgtttataatggagatagatgccatttgctactaccga
atggaaaatgcctctcttctcctaagcagtcttgctcatgtatctaaagctgtgcaattccttgtgcaaaccactat
gaagcgtctcctagcacatcgatccctcactgaaattcttctagagaggaagagcatcgcccaagatgcaaag
gttgccttggattcagtgacctgtatttggggaatcaaagtggagagaatagaaattaaagatgtgaggttgcc
agctgggcttcagcactcactggctgtggaggctgaagcgcaaagacaagccaaagtgcggatgattgctgca
gaagcggaaaaggctgcttctgagtccctgaggatggcagctgagattctgtcaggcaccctgctgctgttca
gcttcgatacctccacacccttcagtctctgtccacagagaagccttccactgtggttttacctttgccatttgacct
actgaattgcctgtcttctcccagcaacagaactcagggaagcctccccttcccaagtccttccaaacctgttga
gccactaaatcctaaaaagaaagactctcccatgtta

FIG. 6

Aatcaacctctggattacaaaatttgtgaaagattgactggtattcttaactatgttgctcctttac
gctatgtggatacgctgctttaatgcctttgtatcatgctattgcttcccgtatggctttcattttctcc
tccttgtataaatcctggttgctgtctctttatgaggagttgtggcccgttgtcaggcaacgtggcgt
ggtgtgcactgtgtttgctgacgcaaccccactggttggggcattgccaccacctgtcagctcctt
tccgggactttcgctttcccctccctattgccacggcggaactcatcgccgcctgccttgccgct
gctggacaggggctcggctgttgggcactgacaattccgtggtgttgtcggggaaatcatcgtcct
ttccttggctgctcgcctgtgttgccacctggattctgcgcgggacgtccttctgctacgtccctcg
gccctcaatccagcggaccttccttcccgcggcctgctgccggctctgcggcctcttccgcgtcttc
gccttcgccctcagacgagtcggatctcccttgggccgcctcccgc

FIG. 7 ctgtgccttctagttgccagccatctgttgtttgccctccccgtgccttccttgaccctggaaggt
gccactcccactgtcctttcctaataaaatgaggaaattgcatcgcattgtctgagtaggtgtcatt
ctattctgggggtggggtggggcaggacagcaagggggaggattgggaagacaatagcagg
catgctggggatgcggtgggctctatgg

FIG. 8

AAV GENE THERAPY FOR TREATING NEPHROTIC SYNDROME

CROSS-REFERENCE TO RELATED APPLICATIONS

This application is a U.S. National Phase of International Patent Application No. PCT/GB2020/050097, filed on 17 Jan. 2020, incorporated by reference, which claims priority under 35 USC § 119 to United Kingdom Patent Application No. 1900702.0, filed on 18 Jan. 2019.

INCORPORATION BY REFERENCE OF MATERIALS SUBMITTED ELECTRONICALLY

This application contains, as a separate part of the disclosure, a Sequence Listing in computer readable form (Filename: 56635_Seqlisting.txt; Size: 5,400 bytes; Created: Jul. 9, 2021), which is incorporated by reference in its entirety.

FIELD OF INVENTION

The present invention relates to gene therapies for use in treating monogenic forms of nephrotic syndrome

BACKGROUND TO THE INVENTION

Nephrotic syndrome (NS) is a chronic kidney disease characterized by significant proteinuria, hypoalbuminemia, oedema and hyperlipidemia, and is the most common primary glomerular disease in children, affecting 2/100,000 children below the age of 16 in Europe and the USA. NS is associated with different ages of onset, from less than 3 months old at diagnosis to early adulthood, and is classified in different patients groups depending on their sensitivity to corticoids: ~80% of children with NS are classified as having steroid-sensitive nephrotic syndrome (SSNS) and can be successfully treated with corticosteroid therapy. A proportion of patients originally classified as SSNS relapse and need further steroid treatment, and a further 10-15% of NS patients do not achieve remission after weeks of therapy with corticosteroids and are classified as having steroid-resistant nephrotic syndrome (SRNS). Up to 50% of these SRNS patients progress to end-stage renal disease within 10 years and commonly face an elevated risk of recurrence after renal transplant, highlighting the lack of suitable and efficient treatment for these patients.

Podocyte dysfunction and resultant disruption of the glomerular filtration barrier is central to the pathogenesis of NS. The podocyte branches off cellular processes to cover the outside of the glomerular capillary, called foot processes, and their interdigitations with neighbouring foot processes form the glomerular slit membrane, critical for the glomerular filtration barrier efficiency and for the retention of protein in the blood stream. In genetic forms of NS, mutations in genes coding for key podocyte processes such as the development, migration, basement membrane interaction, or regeneration of the podocyte, lead to the loss of integrity of the glomerular slit membrane and to the nephrotic syndrome phenotype. Approximately 30% of cases of SRNS in children are genetic, where the most common mutations in childhood are in NPHS2 encoding podocin, accounting for 10-30% of sporadic genetic cases.

Podocin is a 42 kDa hairpin like membrane-associated podocyte-specific protein that is a key component of the protein complex at the slit diaphragm; the cell-cell junction between adjacent podocyte foot processes. It localises to lipid rafts and interacts with other important slit diaphragm proteins like nephrin, CD2AP and TRPC6. It is essential in the maintenance of the slit diaphragm, and consequently the integrity of the glomerular filtration barrier. There are 126 mutations reported to date, but the most common mutation is R138Q, which causes mislocalization of podocin to the endoplasmic reticulum.

As no effective treatment currently exists for patients with monogenic forms of NS, the use of gene therapy for the transfer of a functional gene copy in diseased podocytes could constitute a promising novel strategy to address monogenic forms of NS, reverse NS phenotype and correct kidney dysfunction. Indeed, US2003/0152954 generally suggested the use of viral vectors to deliver nucleic acids encoding polypeptides with podocin activity but failed to disclose or test any specific gene therapy constructs. It is likely that this is because the kidney has a complex anatomy with specialised compartments composed of glomeruli, tubules, vasculature, and interstitium, which makes it a difficult target for gene therapy vectors. To date renal-targeted gene therapy has been largely unsuccessful as the highly differentiated sub-structures of the kidney can be difficult to target and specifically transduce with viral vector approaches (van der Wouden et al., 2004).

A recent study attempted to target the kidney using rAAV vectors in combination with a CMV promoter and GFP or luciferase genes, which were administered via tail vein injection or renal vein injection (Rocca et al 2014). However, tail vein injection was shown to be unsuitable for kidney transduction and, while a low level of gene expression in podocytes was observed, widespread expression was also observed in the liver, despite the use of an allegedly kidney specific promoter. The study additionally failed to demonstrate successful transduction of a NS-associated transgene, such as podocin, and failed to demonstrate long term functional expression of such genes. The study also did not explore AAV serotypes suitable for human renal cell transduction.

The present invention aims to reverse the NS phenotype and correct podocyte-associated kidney dysfunction in patients with monogenic forms of NS by administering AAV gene therapy expressing a NS-associated transgene under the control of a podocyte-specific promoter.

SUMMARY OF THE INVENTION

The present invention provides an adeno-associated virus (AAV) vector gene therapy for use in treating a monogenic form of nephrotic syndrome, wherein the AAV vector comprises: a NS-associated transgene; and minimal nephrin promoter NPHS1 or podocin promoter NPHS2. The gene therapy vector can reverse the NS phenotype and correct podocyte-associated kidney dysfunction in patients with monogenic forms of NS.

Suitable AAV serotypes for use in the vector include 2/9, LK03 and 3B.

The AAV 2/9 serotype has shown significant tropism for newborn and adult mouse kidney, localising to the glomeruli and tubules (Luo et al., 2011; Picconi et al., 2014; Schievenbusch et al., 2010), and AAV2/9 vector combined with renal vein injection has been shown to be suitable for kidney-targeted gene delivery (Rocca at al., 2014). AAV 2/9 is therefore one suitable vector for use in the gene therapy of the present invention.

Synthetic AAV capsids such as LK03 can also be suitable vectors for use in the gene therapy of the present invention.

This vector has been shown to transduce human primary hepatocytes at high efficiency in vitro and in vivo. However, until now it has not been utilised in kidney-targeted gene delivery. The present inventors have demonstrated herein that AAV-LK03 vectors can achieve high transduction of close to 100% in human podocytes in vitro and can be used to transduce podocytes specifically in vitro.

The AAV-LK03 cap sequence consists of fragments from seven different wild-type serotypes (AAV1, 2, 3B, 4, 6, 8, 9), although AAV-3B represents 97.7% of the cap gene sequence and 98.9% of the amino acid sequence. AAV-3B is also known for its human hepatocyte tropism is another a suitable vector for use in the gene therapy of the present invention. To date it has not been utilised in kidney-targeted gene delivery.

The NS-associated transgene used in the gene therapy is a gene associated with a monogenic form of NS and expressed in podocytes, and which encodes a protein of about 833 amino acids or less. This size limitation allows the NS-associated transgene to fit into the gene therapy vector of the present invention.

Suitable NS-associated transgenes include NPHS2; ADCK4; ALG1; ARHGAP24; ARGHDIA; CD151; CD2AP; COQ2; COQ6; DGKE; E2F3; EMP2; KANK2; LAGE3; LMNA; LMX1B; MAFB; NUP85; NUP93; NXF5; OSGEP; PAX2; PDSS2; PMM2; PODXL; SCARB2; SGPL1; Smad7; TP53RK; TPRKB; VDR; WDR73; WT1; ZMPSTE24; and APOL1.

In embodiments of the invention the NS-associated transgene may be an SRNS-associated transgene such as ADCK4; CD2AP; DGKE; EMP2; NPHS2; NUP86; NUP93; SGPL1; WDR73; or WT1.

In preferred embodiments of the invention the NS-associated transgene is NPHS2, which encodes podocin. One example of a suitable human NPHS2 transgene cDNA sequence is shown in FIG. 6 (SEQ ID NO: 5).

The transgene species is preferably matched to the patient species. For example, when treating a human patient one would typically use a human transgene. The transgene may be naturally occurring, e.g. wild-type, or it may be recombinant. The transgene is typically included in the gene therapy vector as a cDNA sequence.

Use of a minimal nephrin promoter such as NPHS1 or podocin promoter NPHS2 allows the gene therapy vector to be targeted specifically to podocytes (Moeller et al., 2002; Picconi et al., 2014). This enables transgene expression to be specifically targeted to podocytes in the glomerular basement membrane of the kidney and minimises off-target expression. As podocytes are terminally differentiated and non-dividing cells they can be targeted for stable expression of the transgene and reduce or avoid any risk of vector dilution effect. In preferred embodiments of the invention the promoter is NPHS1. One example of a suitable DNA sequence for the NPHS1 promoter is shown in FIG. 5. As with the transgene, the species of the promotor is preferably matched to the patient species. For example, when treating a human patient one would typically use human NHPS1 or human NPHS2.

The AAV vector may additionally comprise a Woodchuck hepatitis post-transcriptional regulatory element (WPRE). WPRE is a DNA sequence that, when transcribed, creates a tertiary structure enhancing expression. Inclusion of WPRE may increase expression of the transgene delivered by the vector. The WPRE sequence may be mutated to reduce oncogenicity without significant loss of RNA enhancement activity (Schambach et al., 2005, incorporated herein by reference). One example of a suitable WPRE sequence is shown in FIG. 7 (SEQ ID NO: 6).

The NS-associated transgene may comprise a hemagglutinin (HA) tag. HA can be used as an epitope tag and has been shown not to interfere with bioactivity or biodistribution of proteins to which it has been added. The HA tag can facilitate detection, isolation, and purification of the transgene.

The AAV vector may additionally comprise a Kozak sequence between the promoter and the podocin transgene. The Kozak sequence is known to play a major role in the initiation of the translation process and can therefore enhance expression of the podocin transgene.

The AAV vector may additionally comprise a polyadenylation signal, such as bovine growth hormone (bGH) polyadenylation signal, e.g. as shown in FIG. 8. Polyadenylation is the addition of a poly(A) tail to a messenger RNA. The poly(A) tail consists of multiple adenosine monophosphates; in other words, it is a stretch of RNA that has only adenine bases. The poly(A) tail is important for the nuclear export, translation, and stability of mRNA. Inclusion of a polyadenylation signal can therefore enhance expression of the podocin transgene.

The AAV vector gene therapy additionally typically comprises Inverted Terminal Repeat (ITR) sequences at either end of the vector. For example, the vector structure may be, in order: ITR—promotor—transgene (with optional HA tag)—optional WRPE—polyadenylation signal—ITR.

The gene therapy vector of the present invention can therefore be used to treat or manage monogenic forms of NS in a patient. The term "patient" as used herein may include any mammal, including a human. The patient may be an adult or a paediatric patient, such as a neonate or an infant. In embodiments of the invention the patient may be a paediatric patient between the ages of about 1 and about 16 years old.

The patient is suffering from a monogenic form of NS. In other words, the NS is caused by a mutation in one gene. Preferably mutation is in a gene expressed in podocytes. For example, the NS may be SRNS caused by a mutation in NPHS2, which encodes podocin. Alternatively, the monogenic form of NS may be caused by one or mutations in any one of ADCK4; ALG1; ARHGAP24; ARGHDIA; CD151; CD2AP; COQ2; COQ6; DGKE; E2F3; EMP2; KANK2; LAGE3; LMNA; LMX1B; MAFB; NUP85; NUP93; NXF5; OSGEP; PAX2; PDSS2; PMM2; PODXL; SCARB2; SGPL1; Smad7; TP53RK; TPRKB; VDR; WDR73; WT1; ZMPSTE24; or APOL1. In embodiments of the invention the monogenic form of NS may be a monogenic form of SRNS caused by one or more mutations in any one of ADCK4; CD2AP; DGKE; EMP2; NPHS2; NUP86; NUP93; SGPL1; WDR73; or WT1.

The genetic mutation causing the SRNS may be an NPHS2 mutation affecting podocin expression, such as one or more of those listed in Table A below.

TABLE A

| non-exhaustive list of podocin (NPHS2) mutations. | |
|---|---|
| Nucleotide change | Amino Acid change |
| c.104_126dupGCCGCGGGCGC CAGGAGGCTGGG | p.Pro43Alafs*64 |
| c.H50T > C | p.*384Glnext*7 |
| c.156delG | p.T53Pfs*46 |
| c.167A > G | p.Glu56Gly |
| C.1A > T | p.M1? |

TABLE A-continued non-exhaustive list of podocin (NPHS2) mutations.

| Nucleotide change | Amino Acid change |
|---|---|
| c.259G > T | p.Glu87* |
| c.264_265delGC | p.Pro89Argfs*13 |
| C.353C < T | p.Pro118Leu |
| c.377delA | p.Lys126Argfs*9 |
| C.378 + 1_378 + 2delinsTG | p.(?) |
| C.378 + 1G > A | splice |
| C.378 + 1GT > TG | splice |
| c.378 + 5G > A | splice |
| C.379 − 1G > C | splice |
| c.379 − 2A > C | splice |
| C.385C < T | p.Gln129* |
| c.388G > A | p.Glu130Lys |
| c.397-398delAG | p.Arg133Serfs*33 |
| c.397delA | p.Arg133Glufs*2 |
| C.412C > T | p.Arg138* |
| c.413G > A | p.Arg138Gln |
| c.416T > G | p.Leu139Arg |
| c.419delG | p.Gly140Aspfs*41 |
| c.42delG | p.Arg15Glufs*84 |
| c.451 + 3A > T | splice |
| c.467delT | p.Leu156Cysfs*25 |
| c.467dupT | p.Leu156Phefs*11 |
| c.479A > G | p.Asp160Gly |
| C.486C > A | p.Tyr162* |
| C.502C > T | p.Arg168Cys |
| c.503G > A | p.Arg168His |
| c.506T > C | p.Leu169Pro |
| c.538G > A | p.Val180Met |
| c.593A > C | p.Glu198Ala |
| c.596dupA | p.Asn199Lysfs*14 |
| c.59C > T | p.Pro20Leu |
| C.643C > T | p.Gln215* |
| c.705_713del9 | p.L236del |
| c.705_713delTCTAGAGAG | p.Leu236_Arg238del |
| c.714G > T | p.Arg238Ser |
| c.779T > A | p.Val260Glu |
| c.790G > T | p.Glu264* |
| c.800A > T | p.D267V |
| c.826_833dupCACTCACT | p.Ala279Thrfs*17 |
| c.841G > A | p.Glu281Lys |
| C.851C > T | p.Ala284Val |
| c.855_856delAA | p.Arg286Thrfs*17 |
| c.856delA | p.Arg286Aspfs*7 |
| c.862G > A | p.Ala288Thr |
| c.868G > A | p.Val290Met |
| C.871C > T | p.Arg291Trp |
| c.877A > T | p.Ile293Phe |
| c.883G > A | p.Ala295Thr |
| c.890C > T | p.Ala297Val |
| c.898G > C | p.Ala300Pro |
| c.916A > T | p.R306W |
| C.926C > T | p.Ala309Val |
| c.928G > A | p.Glu310Lys |
| C.934C > G | p.Leu312Val |
| C.946C > T | p.Pro316Ser |
| c.948delT | p.Ala317Leufs*31 |
| c.961delC | p.Leu321Phefs*27 |
| c.965G > C | p.Arg322Pro |
| C.979C > T | p.Leu327Phe |
| c.983A > G | p.Gln328Arg |
| c.1032delT | p.Phe344Leufs*4 |
| Exon 2 del | p.(?) |

In preferred embodiments of the invention the genetic mutation may be p.Arg138Gln, also known as R138Q. R138Q is the most common podocin mutation in children with SRNS in Caucasian populations. The mutation causes endoplasmic reticulum retention of podocin, which prevents it from reaching the slit diaphragm and interacting with other important slit diaphragm proteins to form a functional filtration barrier.

As the NPHS2 mutations are all affecting the same gene any combination of these mutations could be treated by an AAV gene therapy vector of the present invention including an NPHS2 transgene. In other words, the patient may have a p.Arg138Gln mutation and may also have one or more of the other mutations identified in Table A above.

The presence or absence of a monogenic form of NS can be determined by laboratory testing, such as that available from Bristol Genetics Laboratories, Bristol, UK. Typically, genetic testing can be performed by analysis of a blood sample obtained from the patient.

The AAV vector gene therapy may be administered systemically, such as by intravenous injection. In embodiments of the invention the AAV vector gene therapy may be administered by injection into the renal artery. In alternative embodiments of the invention the AAV vector gene therapy may be administered by retrograde administration, e.g. via the ureters using a urinary catheter.

The gene therapy may be administered as a single dose, in other words, subsequent doses of the vector may not be needed. In the event that repeated doses are needed different AAV serotypes can be used in the vector. For example, vector used in a first dose may comprise AAV-LK03 or AAV-3B whereas the vector used in a subsequent dose may comprise AAV 2/9.

Optionally the gene therapy may be administered in combination with temporary immunosuppression of the patient, e.g. by administering the gene therapy at the same time as, or following treatment with, oral steroids. Immunosuppression may be desirable before and/or during gene therapy treatment to suppress the patient's immune response to the vector. However, the AAV capsid is present only transiently in the transduced cell as it is not encoded by the vector. The capsid is therefore gradually degraded and cleared, meaning that a short-term immunomodulatory regimen that blocks the immune response to the capsid until capsid sequences are cleared from the transduced cells can allow long-term expression of the transgene. Immunosuppression may therefore be desirable for a period of about six weeks following administration of the gene therapy.

The AAV vector gene therapy may be administered in the form of a pharmaceutical composition. In other words the AAV vector gene therapy may be combined with one or more pharmaceutically acceptable carriers or excipients. A suitable pharmaceutical composition is preferably sterile.

BRIEF DESCRIPTION OF THE DRAWINGS

The invention will now be described in detail, by way of example only, with reference to the figures.

FIG. 1A) AAV vectors used to express mouse or human podocin or GFP. All vectors contained the Kozak sequence between the promoter and the transgene, as well as WPRE (Woodchuck hepatitis post-transcriptional regulatory element) and the bovine growth hormone (bGH) polyadenylation signal. FIG. 1B) Vector or saline was injected via tail vein in iPod NPHS2$^{fl/fl}$ mice at 8 weeks of age, and induction with doxycycline commenced 10-14 days later. FIG. 1C) qPCR showing presence of AAV ITRs in mouse kidney cortex in mice injected with the viral vector. FIG. 1D) Representative immunofluorescence showing expression of HA tagged podocin with podocyte-specific proteins nephrin and podocin in iPod NPHS2$^{fl/fl}$ mice injected with AAV 2/9. Control (saline) images are of mice without the full iPod NPHS2$^{fl/fl}$ genotype injected and hence did not develop proteinuria or diseased glomeruli, as mice with diseased glomeruli showed loss of podocyte markers.

FIG. 2B) Coomassie staining showing representative images of degree of albuminuria in one mouse from each experimental group. The saline group showed proteinuria from day 14 onwards and showed a large amount of albumin while the vector treated groups showed later onset of albuminuria and milder albuminuria. FIG. 2C) Survival curve showing improved survival in mice injected with either AAV 2/9 hNPHS1.mpod or AAV 2/9 mNPHS1.mpod (Log-rank (Mantel-Cox) test p=0.049, n=3 in each virus group and n=4 in the saline group). FIG. 2D) The number of copies of viral DNA per 50 ng total DNA has an inverse correlation with urinary albumin:creatinine ratio at day 42 (Spearman r=−0.4596, p=0.0477) FIG. 2E) Blood results including cholesterol, albumin, urea, and creatinine at 6 weeks post-doxycycline. (n=minimum of 3 mice in each group except for cholesterol with minimum of n=2 in each group) FIG. 2F) Histology showing representative images from each group on light microscopy. Saline injected group showed glomerular hypertrophy, increased collagen deposition and segmental sclerosis, along with tubular dilatation, consistent with FSGS. Those injected with AAV 2/9 expressing mouse podocin exhibited a range of histological findings which roughly correlated with their urine albumin:creatinine ratio at death. Some mice had healthy normal glomeruli, while others showed mild evidence of disease like pseudo-crescent formation (arrow) seen in the mouse injected with AAV 2/9 mNPHS1.mpodHA. FIG. 2G) iPod NPHS2$^{fl/fl}$ mice injected with saline showed loss of podocin, while nephrin expression showed a change from predominantly membranous staining to a diffuse pattern.

FIGS. 3A-3F. AAV LK03 shows efficient transduction of human podocytes in vitro with the minimal human nephrin promoter. FIG. 3A, 3C, 3E) immunofluorescence demonstrating transduction of human podocytes (Pod), glomerular endothelial cells (GEnC) and proximal tubule epithelial cells (PTEC) by AAV LK03 CMV GFP, with only expression of GFP in podocytes when using the minimal nephrin promoter AAV LK03 hNPHS1 GFP. FIG. 3B) Western blot demonstrating GFP expression in podocytes only when using the minimal human nephrin promoter using AAV LK03. FIG. 3D) Flow cytometry demonstrating highly efficient transduction of podocytes using AAV LK03 CMV GFP, and confirming the GFP expression using the minimal nephrin promoter was only seen in podocytes. In comparison, AAV 2/9 CMV GFP showed low transduction efficiencies in podocytes (n=3) FIG. 3F) Bar chart showing median fluorescence intensity in podocytes transduced with AAV LK03 and histogram showing the degree of green fluorescence in podocytes transduced with AAV LK03 CMV GFP (right-hand peak), AAV LK03 hNPHS1 GFP (central peak) and untransduced cells (left-hand peak).

FIG. 4A) Western blot showing AAV LK03.CMV.hpodocinHA and AAV LK03.hNPHS1.hpodocinHA transduces R138Q podocytes and expresses HA-tagged podocin. FIG. 4B) Immunofluorescence demonstrating expression of HA tagged wild type podocin in the mutant podocin R138Q podocytes. FIG. 4C) Adhesion assay showing a decrease in adhesion in mutant podocin R138Q podocytes, with rescue of adhesion in R138Q podocytes treated with AAV LK03.hNPHS1.hpodHA.WPRE.bGH. FIG. 4D) confocal microscopy showing HA-tagged podocin does not colocalize with calnexin, an endoplasmic reticulum marker FIG. 4E) TIRF microscopy demonstrating expression of HA-tagged podocin within 100 nm of the plasma membrane with some colocalization with caveolin, a lipid raft marker.

FIG. 5 (SEQ ID NO: 4) shows an example DNA sequence for the minimal human nephrin promoter (NPHS1).

FIG. 6 (SEQ ID NO: 5) shows an example cDNA sequence for a human podocin transgene.

FIG. 7 (SEQ ID NO: 6) shows an example DNA sequence for a WPRE sequence.

FIG. 8 (SEQ ID NO: 7) shows an example DNA sequence for a bGH poly(A) signal sequence.

EXAMPLES

Methods

Vector Production

Figure 1A:
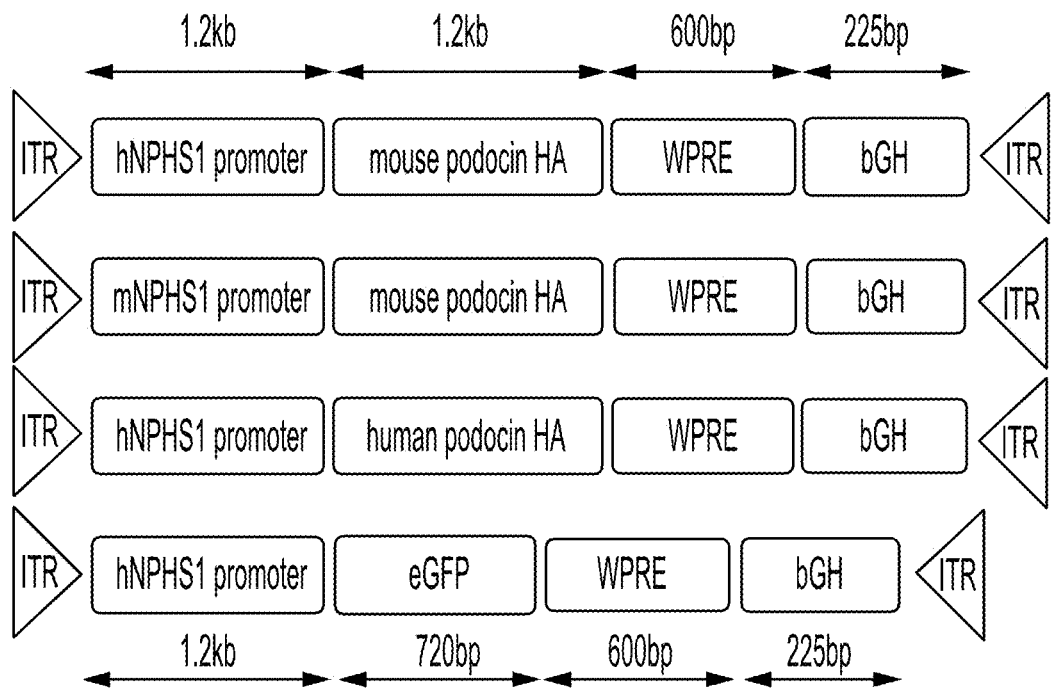
FIGS. 1A-1D show that AAV 2/9 administered by tail vein injection transduces the kidney and expresses HA-tagged podocin in the podocyte.

We prepared pAV.hNPHS1.mpodHA.WPRE.bGH, pAV.mNPHS1.mpodHA.WPRE.bGH and pAV.hNPHS1.hpodHA.WPRE.bGH (FIG. 1A) pAV.mNPHS1.hHAVDR.WPRE.bGH and pAV.mNPHS1.hHASmad7.WPRE.bGH in our laboratory from a CMV eGFP L22Y pUC-AV2 construct (kind gift of Amit Nathwani) using human (FIG. 6 (SEQ ID NO: 5)) and mouse (sequence not shown) podocin cDNA (Origene, Herford, Germany) and human VDR and Smad7 cDNA. Human embryonic kidney 293T cells were transfected with a capsid plasmid (pAAV9 from Penn Vector Core, pAAV LK03 was the kind gift of Mark Kay), a helper plasmid with adenoviral genes and the transgene plasmid using polyethyleneimine. Cells and supernatant were harvested at 72 hours post-transfection. Cells underwent 5 freeze-thaw cycles, while the supernatant underwent PEG precipitation (8% PEG 0.5N NaCl). These were combined and incubated with 0.25% sodium deoxycholic acid and 70 units/ml Benzonase for 30 minutes at 37° C. The vector was purified by iodixanol gradient ultracentrifugation, and subsequently concentrated in PBS. Vectors were titrated by qPCR using the standard curve method using the following primers:

```
                                         (SEQ ID NO: 1)
ITR F GGAACCCCTAGTGATGGAGTT, (SEQ ID NO: 2)
ITR R CGGCCTCAGTGAGCGA, (SEQ ID NO: 3)
ITR probe FAM-5'-CACTCCCTCTCTGCGCGCTCG-3'-TAMRA.
```

Animals

Figure 1B:
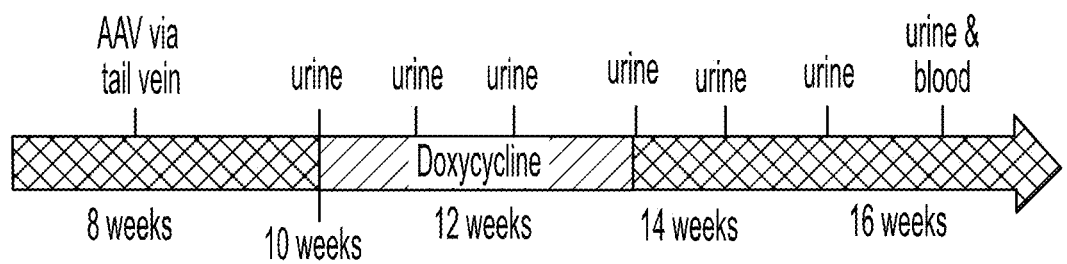

All animal experiments and procedures were approved by the UK Home Office in accordance with the Animals (Scientific Procedures) Act 1986, and the Guide for the Care and Use of Laboratory Animals was followed during experiments. NPHS2$^{flox/flox}$ mice (kind gift of Corinne Antignac, INSERM U983, Paris) were bred with NPHS2-rtTA/Tet-On Cre mice to generate offspring with NPHS2-rtTA/Tet-On Cre/NPHS2$^{flox/flox}$. These mice develop a podocyte-specific knockout of podocin when exposed to doxycycline. These will be called iPod NPHS2$^{fl/fl}$ from hereon. Mice were on a mixed background and equal numbers of each sex were used. Mice were administered AAV via tail vein injection at 8 weeks of age. (FIG. 1B) 10 to 14 days later, mice were provided with drinking water supplemented with doxycycline 2 mg/ml and 5% sucrose for 3 weeks. Urine was taken weekly. Mice were culled by Schedule 1 methods at 6 weeks post initiation of doxycycline. A small number of mice were kept beyond 6 weeks to test for effect on survival. All mice were re-genotyped from tissue taken at death.

Cell Culture

Conditionally immortalised human podocytes (Pod) were cultured in RPMI with L-glutamine and $NaHCO_3$ with 10% Fetal Bovine Serum (Sigma Aldrich, Gillingham, UK). Conditionally immortalised human glomerular endothelial cells (GEnC) were cultured in EBM™-2 Endothelial Cell Growth Basal Medium-2 supplemented with EGM™-2 Endothelial Cell Growth Medium-2 BulletKit™ (Lonza, Basel, Switzerland). Immortalised proximal tubule epithelial cells (ATCC, Teddington, UK) (PTEC) were cultured in DMEM/F12 supplemented with Insulin, Transferrin and Selenium, Hydrocortisone and 10% FBS.

Cells were transduced with AAV at a MOI of $5 \times 10^5$. For GFP expression, cells were used at 5-7 days post transduction to allow comparisons across different cell lines. For podocin, VDR and Smad7 expression, cells were used at 10-14 days post transduction when podocytes are maximally differentiated.

Quantitative PCR

DNA was extracted using DNeasy Blood and Tissue Kit (Qiagen, Manchester, UK) from mouse kidney cortex. AAV DNA was detected using the primers above for viral titration and normalised against mouse beta-actin.

RNA was extracted using RNeasy Mini Kit with RNase-Free DNase set (Qiagen, Manchester, UK).

Immunofluorescence

5 μm sections were fixed using 4% PFA and blocked with 3% BSA 0.3% Triton X-100 and 5% of either goat or donkey serum. Primary antibodies were anti-HA High Affinity from rat IgG1 (Roche, Basel, Switzerland), Guinea Pig anti-Nephrin (1243-1256) Antibody (Origene, Herford, Germany), and Rabbit anti-NPHS2 Antibody (Proteintech, Manchester, UK).

Cells were fixed with either 4% PFA and or ice cold methanol, incubated for 5 minutes with 0.03M glycine, permeabilised with 0.3% Triton then blocked with 3% BSA. Primary antibodies were mouse HA.11 Epitope Tag Antibody (Biolegend, San Diego, USA), mouse anti-GFP (Roche, Basel, Switzerland), rabbit anti-Calnexin (Merck Millipore, Darmstadt, Germany) and rabbit anti-Caveolin 1 (Cell Signaling, Danvers, USA).

Secondary antibodies were AlexaFluor 488 donkey anti-mouse, AlexaFluor 488 donkey anti-rabbit, AlexaFluor 488 goat-anti guinea pig, AlexaFluor 555 goat anti-rabbit and AlexaFluor 633 goat anti-rat, and AlexaFluor 633 Phalloidin (Invitrogen, Thermo Fisher Scientific, Waltham, USA). Sections were counterstained with DAPI and mounted with Mowiol. Images were taken on a Leica SPE single channel confocal laser scanning microscope attached to a Leica DMi8 inverted epifluorescence microscope, or Leica SP5-II confocal laser scanning microscope attached to a Leica DMI 6000 inverted epifluorescence microscope, or Leica AM TIRF MC (multi-colour) system attached to a Leica DMI 6000 inverted epifluorescence microscope using LAS (Leica Application Suite) X Software.

Western Blotting

Cells were extracted in SDS lysis buffer. Samples were run on a 12.5% gel and transferred to PVDF membrane. Membranes were blocked in 5% milk in TBST 0.1%. Primary antibodies used were mouse HA.11 Epitope Tag Antibody (Biolegend, San Diego, USA), mouse anti-GFP (Roche, Basel, Switzerland) in 3% BSA in TBST 0.1%, or rabbit anti-NPHS2 antibody (Proteintech, Manchester, UK). Secondary antibodies were anti-rabbit or anti-mouse IgG Peroxidase (Sigma Aldrich, Gillingham, UK) in 3% BSA in TBST 0.1%. Membranes were imaged on Amersham Imager 600.

Flow Cytometry

Live cells were stained with propidium iodide and only live single cells were included in the analysis. Flow cytometry was carried out on the NovoCyte Flow Cytometer.

Adhesion Assay

Cells were trypsinised and resuspended at $10^5$/ml and allowed to recover for 10 minutes before plating 50 μl of cells diluted 1 in 2 with PBS in a 96 well plate. Technical triplicates were used. Cells were left to adhere for about 1 hour at 37° C.

Cells were washed with PBS to wash away non adherent cells, then fixed with 4% PFA for 20 minutes. Cells were washed with distilled water then stained with 0.1% crystal violet in 2% ethanol for 60 minutes at room temperature. Cells were washed and incubated with 10% acetic acid on a shaker for 5 minutes. Absorbance was measured at 570 nm and results were normalised against the wild type cell line transduced with AAV LK03 CMV GFP.

Urine

Albumin levels were measured using a mouse albumin ELISA kit (Bethyl Laboratories Inc, Montgomery, USA) and Creatinine levels were measured on the Konelab Prime 60i Analyzer.

Blood Tests

Mouse plasma was processed either using the Konelab Prime 60i analyser or the Roche Cobas system with reagents and protocols supplied by the manufacturer.

Statistical Analysis

All data is presented as mean #SEM unless stated otherwise. Statistical analyses were performed in GraphPad Prism (Graphpad softward, La Jolla, USA). Statistical tests used include two-tailed t-test, one-way ANOVA with Tukey's multiple comparison posthoc analysis, two-way ANOVA with Tukey's multiple comparison posthoc analysis, and Logrank (Mantel-Cox) test for survival analysis.

Results

Figure 1C:
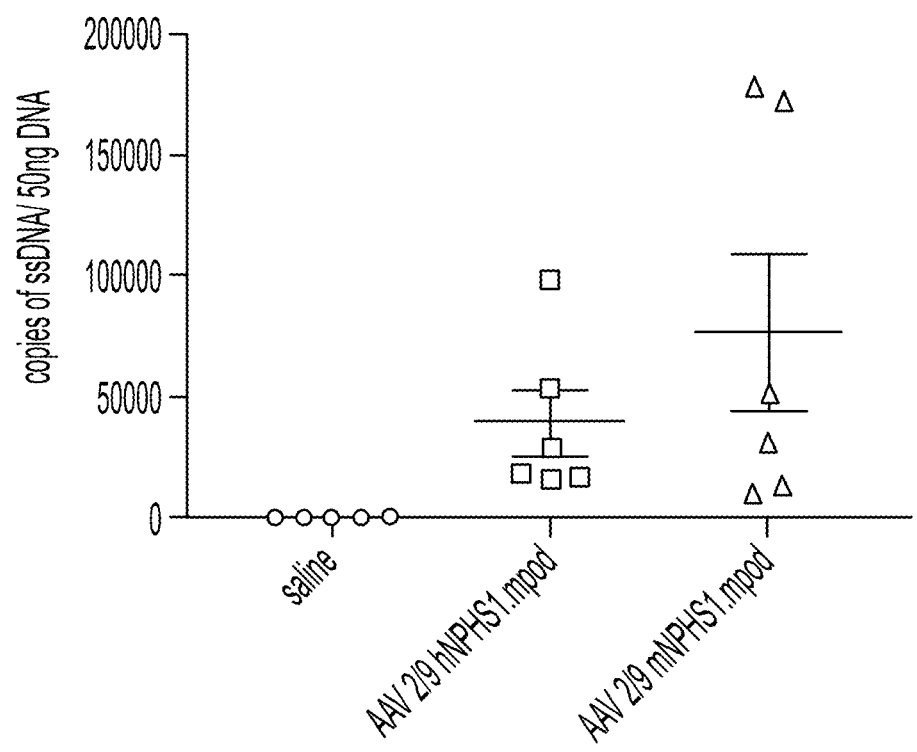
Figure 1D:
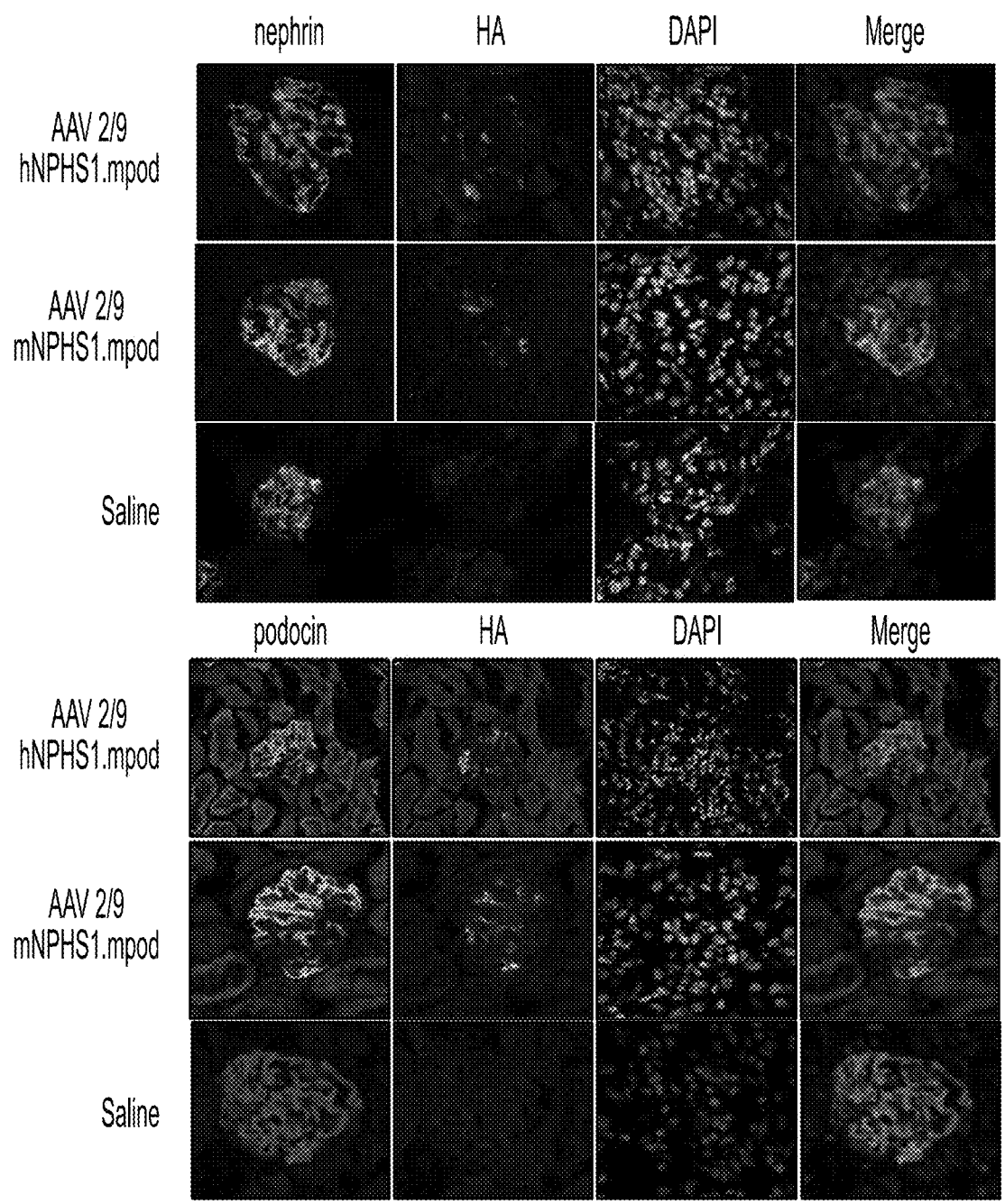

Tail Vein Injection of AAV Serotype 9 Demonstrates Transduction of Kidney Cells And Expression in the Podocyte At 8 weeks of age, mice were administered $1.5 \times 10^{12}$ vg via tail vein of either AAV2/9 hNPHS1.mpod or AAV2/9 mNPHS1.mpod, or saline. 6 weeks later, AAV ITRs were detected in the kidney cortex of mice injected with AAV (AAV 2/9 hNPHS1.mpod=39,067±13,285 copies SSDNA, AAV 2/9 mNPHS1mpod=76,533.33±32047 copies ssDNA, n=5-6/group) (FIG. 1C). HA-tagged podocin was shown to co-localise with podocyte markers nephrin and podocin (FIG. 1D).

Figure 2A:
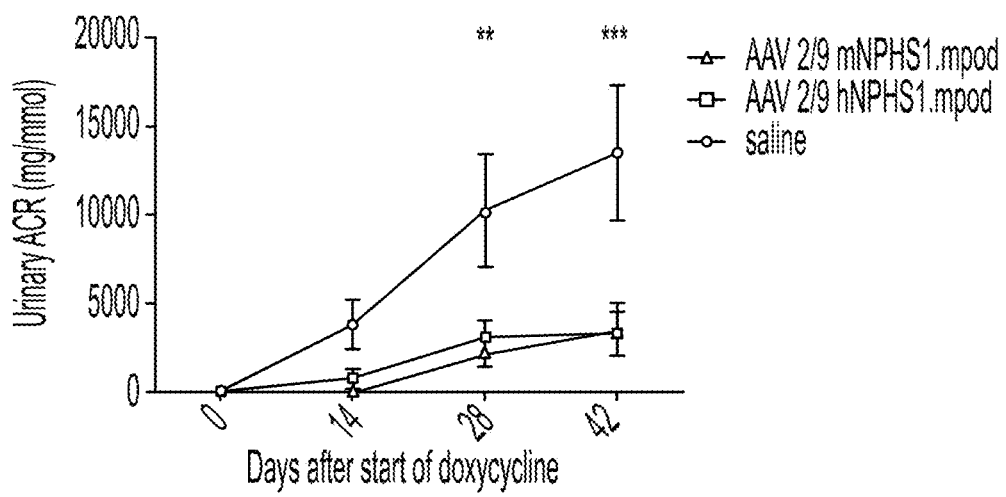
FIGS. 2A-2G show that tail vein injection of AAV 2/9 expressing wild-type podocin under a podocyte-specific promoter ameliorates proteinuria in the conditional podocin knock-out mouse model (iPod NPHS2$^{fl/fl}$) FIG. 2A) Urinary albumin:creatinine ratio of mice injected with AAV 2/9 mNPHS1.mpod versus AAV 2/9 hNPHS1.mpod versus saline (n=9 in each group, p<0.01*p<0.001).
Figure 2B:
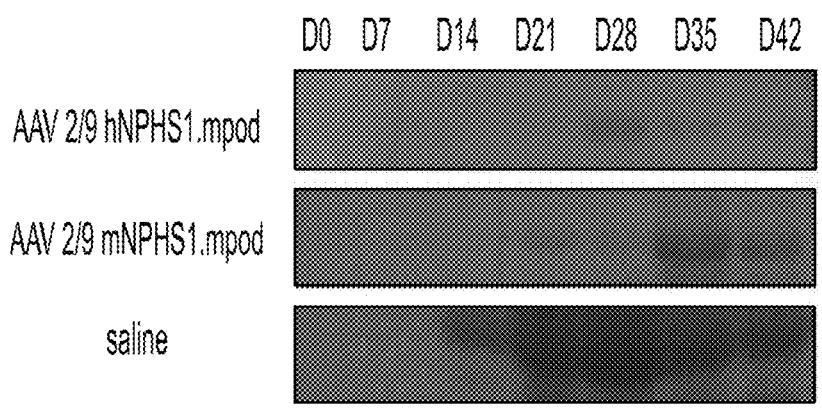
Figure 2C:
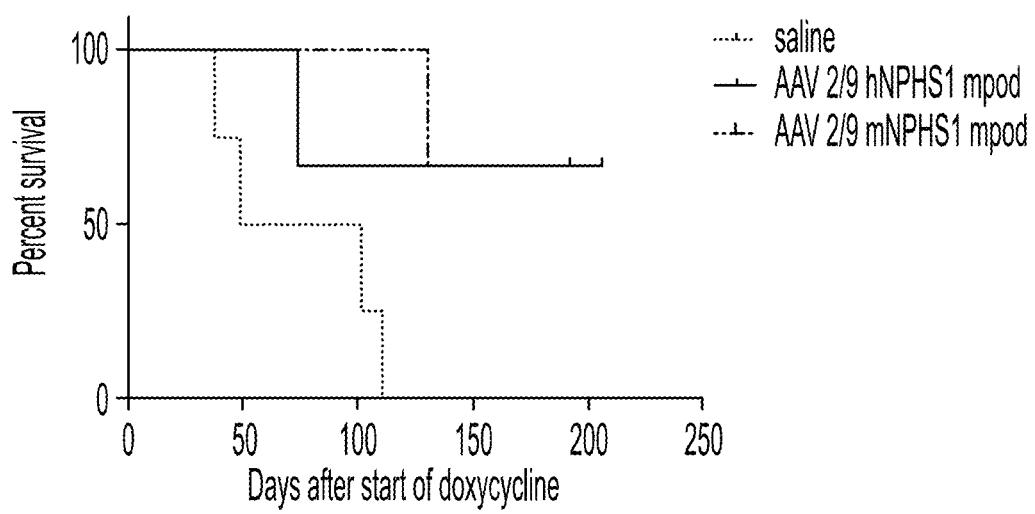

AAV2/9 expressing wild type podocin reduces albuminuria in iPod NPHS26/f mice Vector treated groups showed a reduction in urinary albumin:creatinine ratio (ACR) (FIG. 2A, 2B). The effect of tail vein injection of AAV 2/9 expressing podocin on urinary ACR yielded an F ratio of F (2, 24)=9.61, p<0.001 (n=9/group). At 14 days post-doxycycline, urinary ACR was higher in the saline group than either of the vector treated groups, although this was not significant (AAV 2/9 hNPHS1.mpod=758.1±488.1 mg/mmol, AAV 2/9 mNPHS1.mpod=59.8±28.0 mg/mmol, saline=3,770.1±1337.6 mg/mmol, AAV 2/9 hNPHS1.mpod vs saline p=0.40, AAV 2/9 mNPHS1.mpod vs saline p=0.25). There was a significant reduction in urinary ACR in the vector treated groups at day 28 (AAV 2/9 hNPHS1.mpod=3,083.0±932.8 mg/mmol, AAV 2/9 mNPHS1.mpod=2,195.1±778.9 mg/mmol, saline=10, 198±3,189.5 mg/mmol, AAV 2/9 hNPHS1.mpod vs saline p=0.008, AAV 2/9 mNPHS1.mpod vs saline p=0.002) and day 42 (AAV 2/9 hNPHS1.mpod=3,266.8±1,212.2 mg/mmol, AAV 2/9 mNPHS1.mpod=3,553.3±1,477.87 mg/mmol, saline=13,488.8±3,877.3 mg/mmol, AAV 2/9 hNPHS1.mpod vs saline p<0.001, AAV 2/9 mNPHS1.mpod vs saline p<0.001). In the vector treated groups, 2 of 9 mice in AAV 2/9 hNPHS1.mpod group and 1 of 9 mice in AAV 2/9 mNPHS1.mpod group had urinary ACRs of less than 30 mg/mmol at day 42.

Figure 2D:
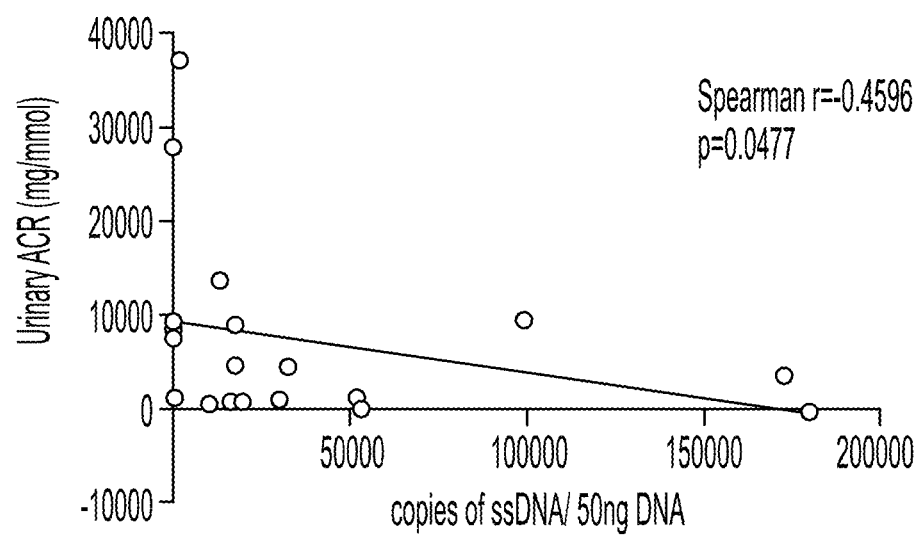

Although the mice in vector treated groups showed an improvement, there was a large degree of variation within the groups which we hypothesised might be attributable to amount of vector that reached the kidney after a systemic injection. The amount of viral DNA detected in kidney cortex showed an inverse correlation with the degree of albuminuria at day 42 (Spearman r=−0.4596, p=0.0477) (FIG. 2D).

Figure 2G:
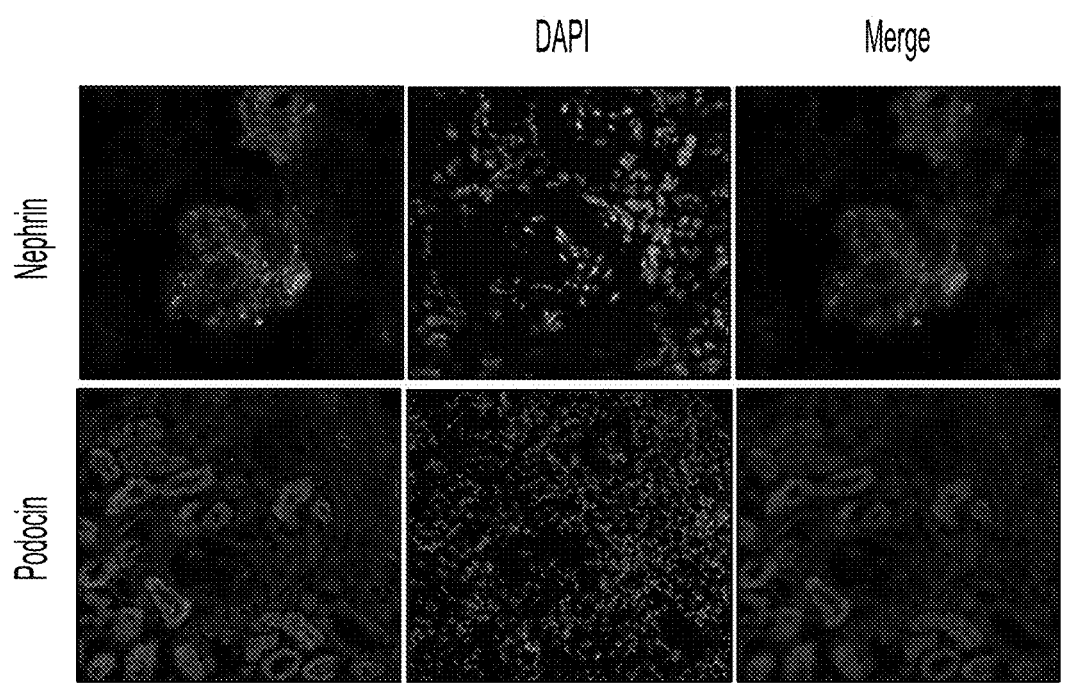
Figure 2E:
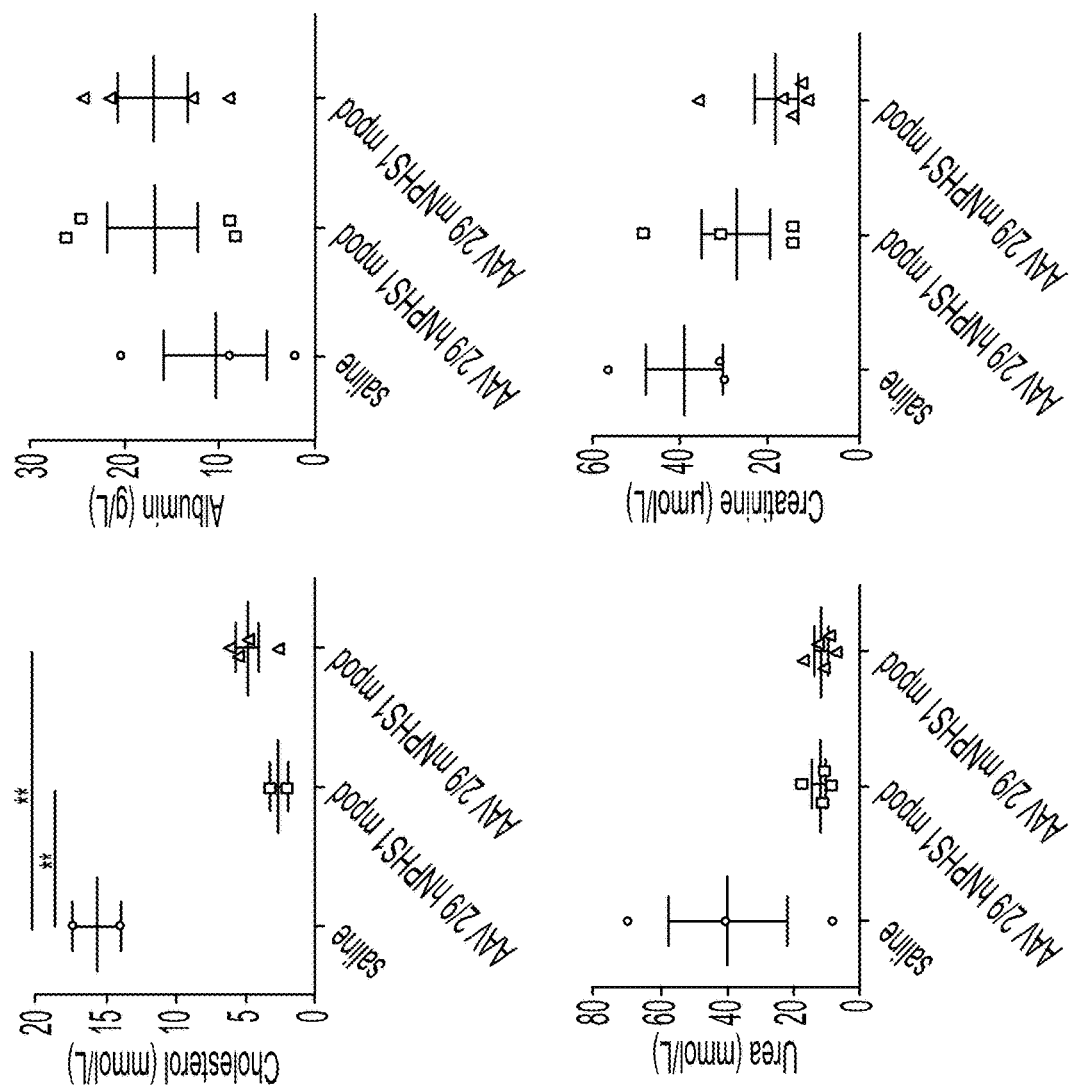

AAV2/9 Expressing Wild Type Podocin Partially Rescues the Phenotype in iPod NPHS2$^{fl/Fl}$ Mice Vector treated mice showed a reduction in creatinine (saline=39.0±8.5 μmol/L, AAV 2/9 hNPHS1.mpod=27.3±7.9 μmol/L, AAV 2/9 mNPHS1.mpod=18.6±4.4 mmol/L, p=0.1622), a reduction in urea (saline=39.4±17.6 mmol/L, AAV 2/9 hNPHS1.mpod=12.0±2.0 mmol/L, AAV 2/9 mNPHS1.mpod=11.6±1.6 mmol/L, p=0.058), an increase in albumin (saline=10.5±5.4 g/L, AAV 2/9 hNPHS1.mpod 17.1=4.8±g/L, AAV 2/9 mNPHS1.mpod=17.1±3.6 g/L, p=0.5602) and a significant reduction in cholesterol (saline=15.76±1.75 mmol/L, AAV 2/9 hNPHS1.mpod=2.64±0.60 mmol/L, AAV 2/9 mNPHS2.mpod=4.86±0.76 mmol/L, p=0009) (FIG. 2E).

Figure 2F:
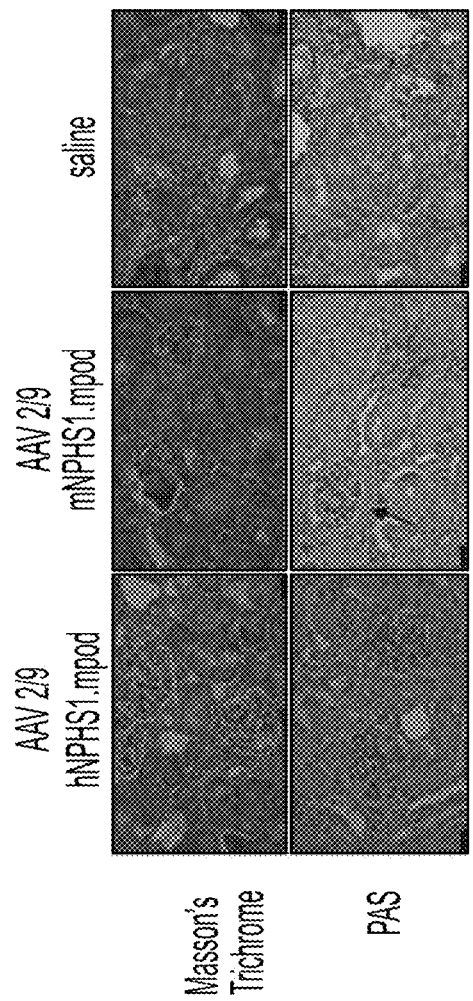

Saline treated mice showed histological features of FSGS by 6 weeks. Vector treated mice did not show histological features of FSGS on light microscopy, but demonstrated a range of histological findings from completely normal glomeruli to pseudo-crescents or mesangial hypercellularity. (FIG. 2F)

These mice also showed prolonged survival (n=3-4/group), with a median survival of 75.5 days (range 38 to 111 days) in the saline group, compared to median survival of 192 days (range 74 to still alive at 206 days) in AAV 2/9 hNPHS1.mpod and median survival of 192 days (range 131 to still alive at 206 days) in AAV 2/9 mNPHS1.mpod (p=0.049).

Untreated mice show loss of expression of podocin with a change in pattern of expression of nephrin to a diffuse pattern (FIG. 2G). This is a stark contrast to the predominantly membranous pattern of expression of nephrin and podocin seen in vector treated mice (FIG. 1D).

Figure 3A:
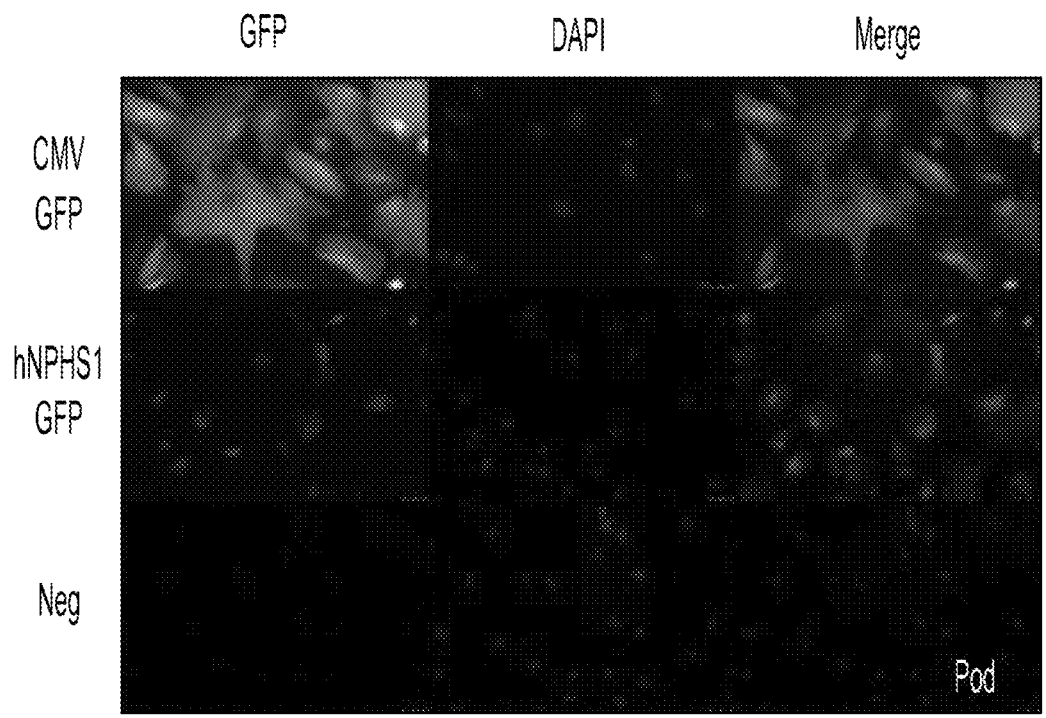
Figure 3B:
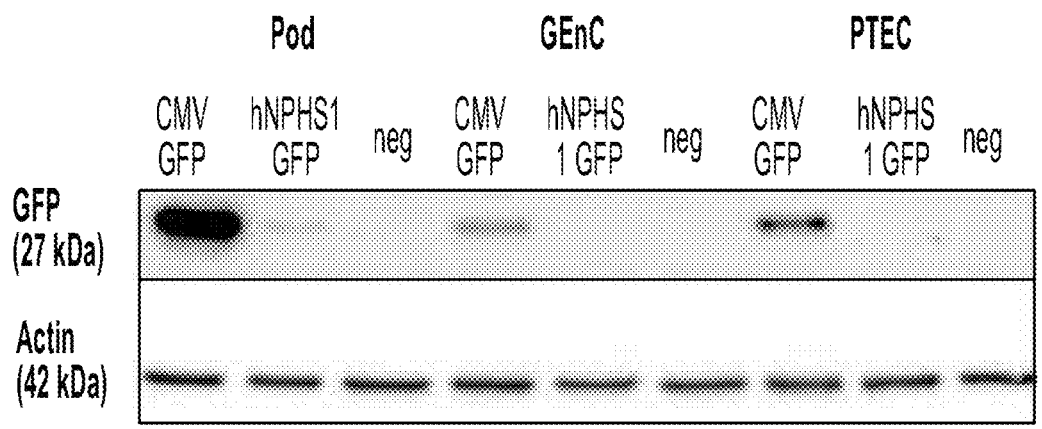
Figure 3C:
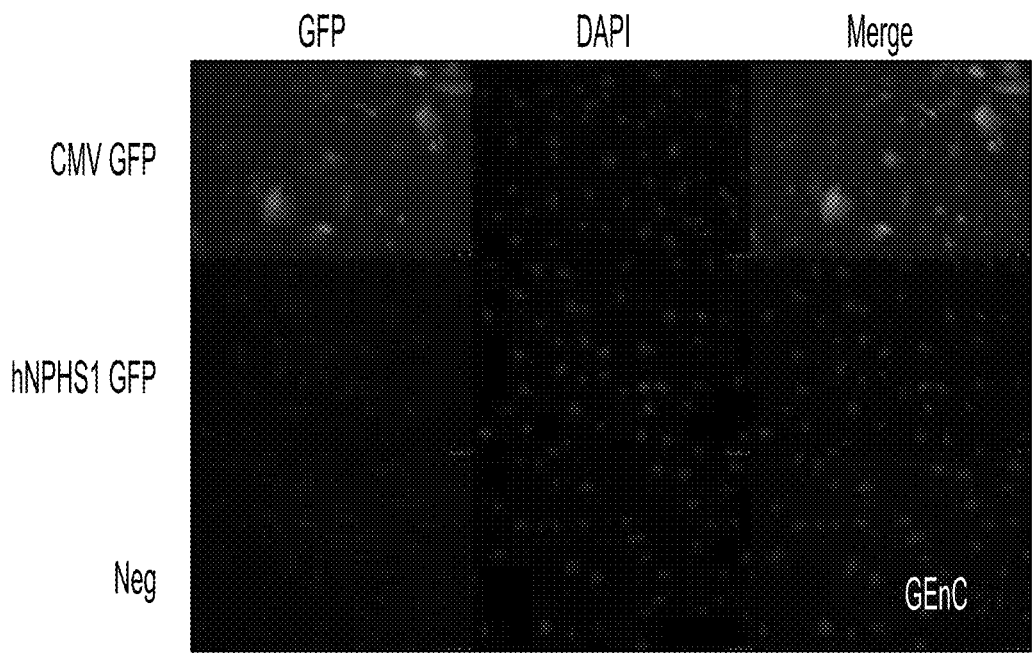
Figure 3D:
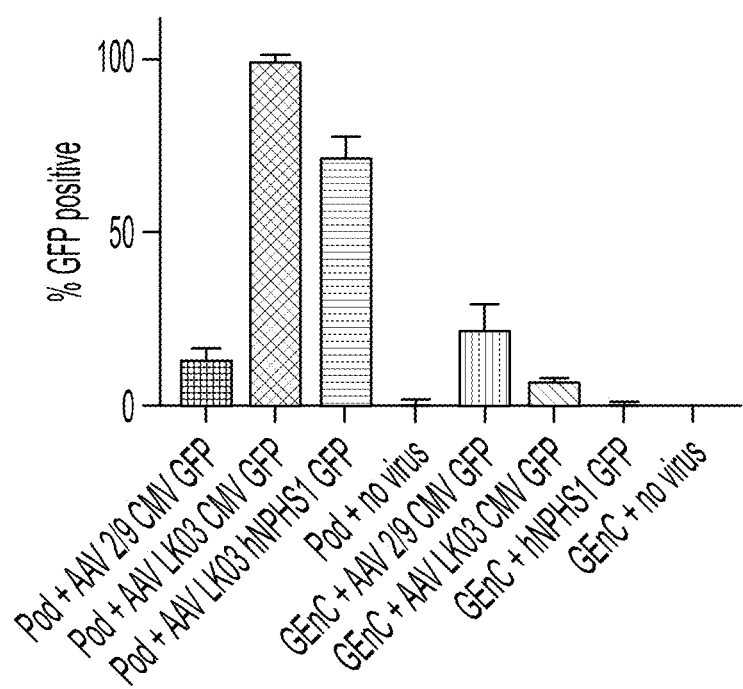
Figure 3E:
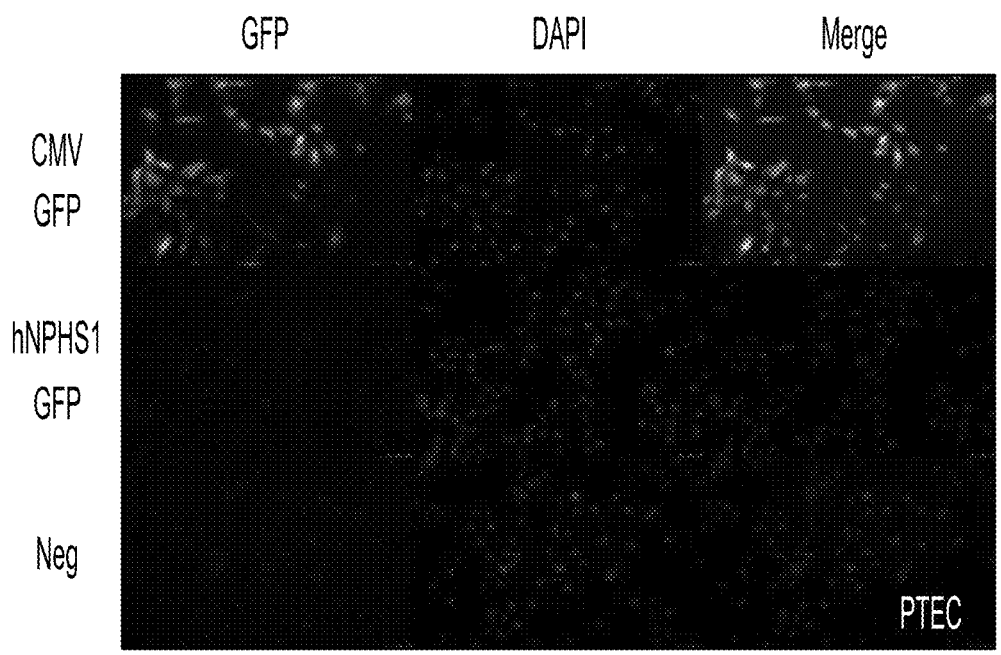

AAV LK03 Transduces Human Podocytes Efficiently In Vitro with the Minimal Human Nephrin Promoter AAV LK03 with CMV GFP and AAV LK03 hNPHS1 GFP were used to transduce human podocytes, glomerular endothelial cells and proximal tubular epithelial cells at a MOI of 5×10$^5$. Flow cytometry (n=3) showed that AAV LK03 CMV GFP had highly efficient transduction the of podocyte (% GFP expression=98.83±0.84), AAV LK03 hNPHS1 GFP had good transduction (% GFP expression=71.3±3.39) and untransduced cells had unremarkable expression (% GFP expression=0.89±0.36) (FIG. 3D). This is reflected on immunofluorescence (FIG. 3A, 3C, 3E) and western blot (FIG. 3B). Although the proportion of cells positive for GFP expression is high in podocytes transduced with AAV LK03 hNPHS1 GFP, the cells have a lower fluorescence intensity than those transduced with AAV LK03 CMV GFP (FIG. 3F).

Figure 9A:
FIG. 9 shows human podocytes transduced with either HAVDR (A) or HASmad7 (B) using AAV LK03 with the minimal human nephrin promoter.
Figure 9B:
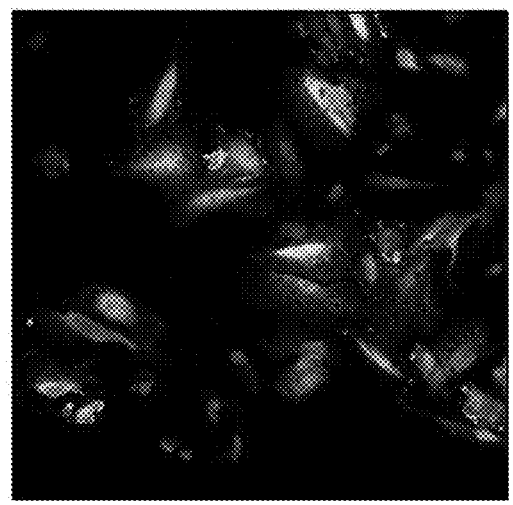

Interestingly, AAV LK03 CMV GFP showed much lower transduction in glomerular endothelial cells (% GFP expression=7.35±0.19). AAV LK03 hNPHS1 GFP showed minimal transduction in endothelial glomerular cells GFP (% expression=0.59±0.10), on a similar level to untransduced glomerular endothelial cells (% GFP expression=0.23±0.02). As AAV 2/9 has been the serotype which has seen the best transduction in kidney cells in vivo in rodent kidneys, we tested the expression of AAV 2/9 CMV GFP on human kidney cell lines. AAV 2/9 CMV GFP showed low transduction efficiency in both podocytes (% GFP expression=13.9±1.98) and glomerular endothelial cells (% GFP expression=21.99±4.35) (FIG. 3D). AAV LK03 with AAV LK03 hNPHS1 HAVDR and AAV LK03 hNPHS1 hSmad7 were used to transduce human podocytes showing good expression of both proteins (FIG. 9).

Figure 4A:
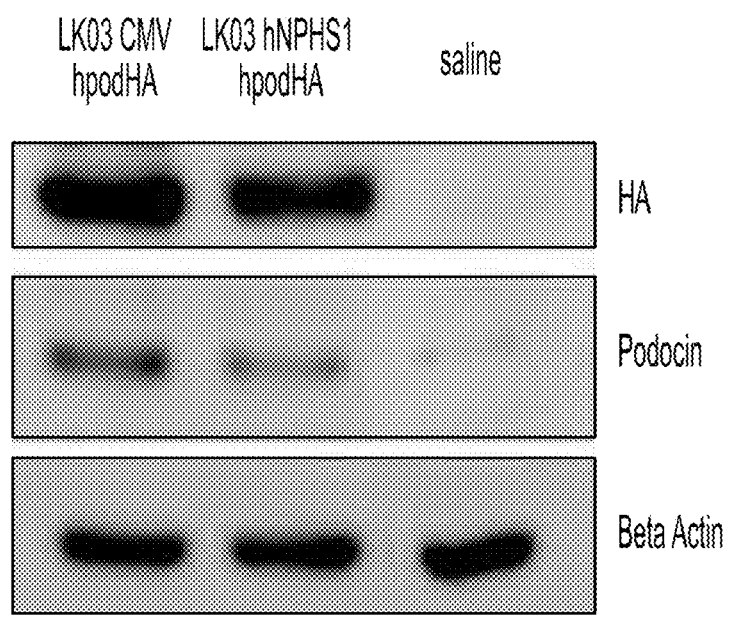
FIGS. 4A-4E. AAV LK03 expressing wild type human podocin shows functional rescue in the mutant podocin R138Q podocyte cell line.
Figure 4B:
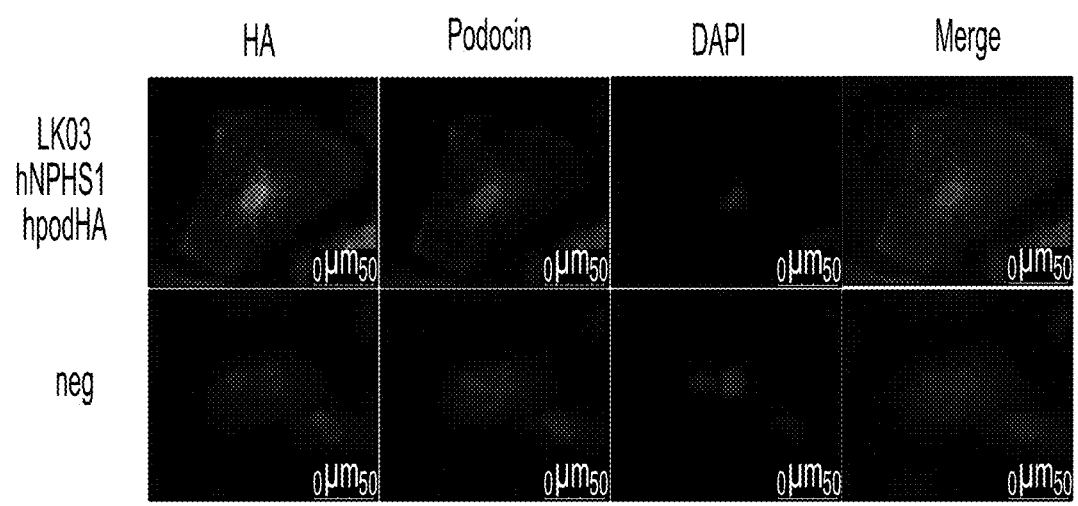
Figure 4C:
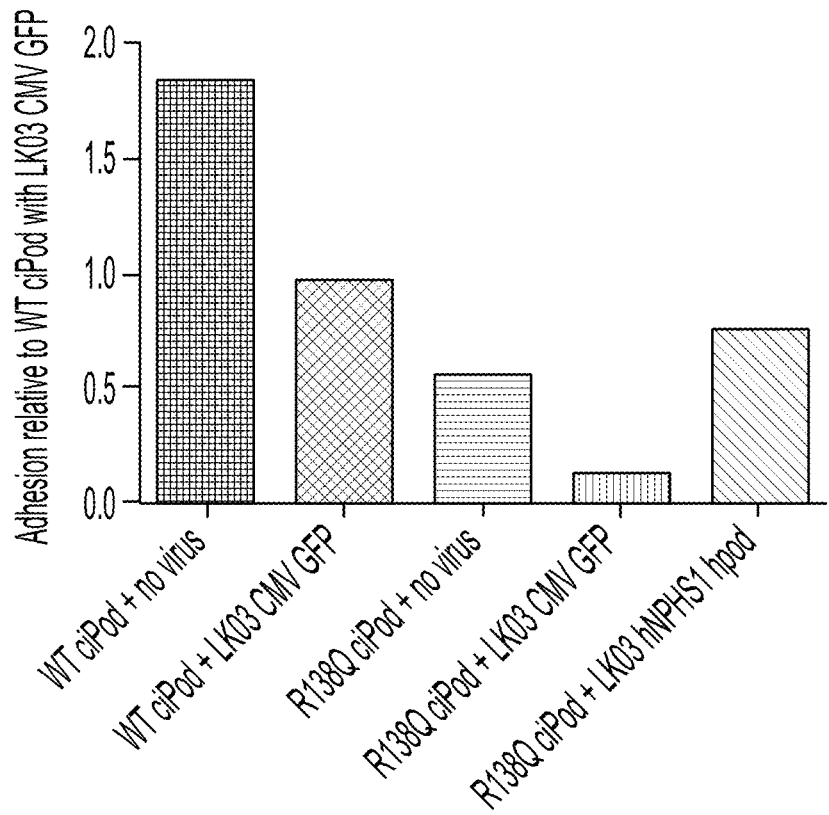
Figure 4D:
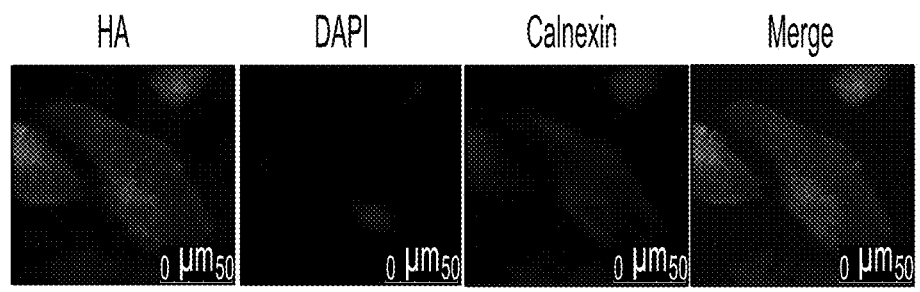
Figure 4E:
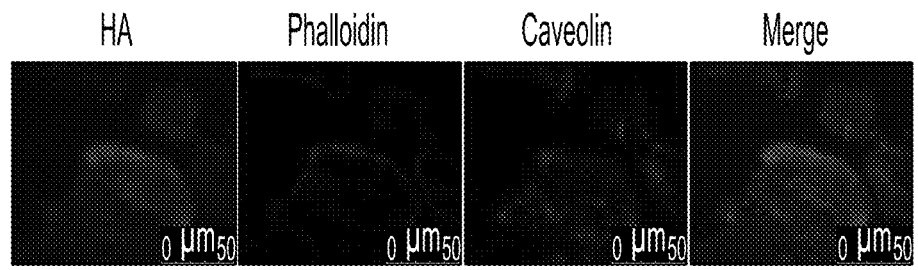

AAV LK03 Expressing Human Podocin Under the Minimal Nephrin Promoter Shows Functional Rescue in Mutant Podocin R138Q Podocyte Cell Line The R138Q podocin mutant results in mislocalization of podocin from the plasma membrane to the endoplasmic reticulum. The mutant podocin R138Q podocyte cell line was acquired from a patient kidney and conditionally immortalised using temperature sensitive SV40 T antigen. AAV LK03 hNPHS1 hpod transduces R138Q podocytes and expresses HA-tagged podocin (FIG. 4A, 4B). HA-tagged podocin is seen at the plasma membrane on confocal microscopy and colocalises with Caveolin-1, a lipid raft protein, as seen on TIRF microscopy (FIG. 4B, 4E). Untransduced R138Q podocytes do not show any podocin expression at the plasma membrane (FIG. 4B). HA-tagged podocin does not colocalise with Calnexin, an endoplasmic reticulum marker (FIG. 4D).

Podocytes show a decrease or increase in adhesion in diseased states. Previous work in our laboratory has shown that the R138Q mutation causes a decrease in podocyte adhesion. AAV transduction causes a decrease in podocyte adhesion but the R138Q podocytes still show reduced adhesion compared to wild type podocytes, and transduction with AAV LK03 hNPHS1 hpod results in the rescue of the adhesional function of R138Q podocytes (FIG. 4C).

DISCUSSION

Here we have successfully targeted the podocyte with AAV 2/9 using a minimal nephrin promoter to express mouse podocin in a conditional mouse knock-out model, with partial rescue of the phenotype and improvements in albuminuria seen in vector treated mice. As a first proof of principle study, we have chosen to inject the vector prior to doxycycline induction, so that effective rescue by the vector is in place when podocin is knocked out. The effect of doxycycline induction is rapid, and the progression to severe nephrosis (8-14 days) and FSGS is relative quick (about 6 weeks). We have shown here that in vitro, introducing wild type human podocin to R138Q podocytes enables expression of podocin that reaches the plasma membrane, and rescues podocyte adhesion.

Although we have shown that the vector improves albuminuria and survival in these mice, there is large degree of variability in the degree of albuminuria both in treated and untreated mice. The variability within treated mice could be at least partially explained by the amount of viral transduction in the kidney (FIG. 2D).

AAV LK03 has shown high transduction of close to 100% in human podocytes in vitro, which is reduced to 72.3% when using the minimal human nephrin promoter. We have shown that we can use this serotype to transduce podocytes specifically in vitro, and that expression of wild type podocin in R138Q mutant podocytes show functional rescue. Using AAV LK03 has implications on translation as such effective transduction of human podocytes might enable a significant reduction in effective dose in humans. A recent UK study has shown low anti AAV LK03 neutralising antibody seroprevalence of 23%, with a nadir in late childhood (Perocheau, D. P. et al.), which makes this particular serotype a promising candidate for translational studies.

We describe a first proof of principle study that demonstrates AAV transduction of podocytes with a podocyte-specific promoter ameliorates albuminuria in the iPod NPHS2$^{fl/fl}$ mouse model. We also show that a synthetic capsid, AAV LK03, shows highly efficient transduction of human podocytes. In combination, this work is a first step towards translation of AAV gene therapy targeting monogenic disease of the podocyte.

REFERENCES

LUO, X., HALL, G., LI, S., BIRD, A., LAVIN, P. J., WINN, M. P., KEMPER, A. R., BROWN, T. T. & KOEBERL, D. D. 2011. Hepatorenal correction in murine glycogen storage disease type I with a double-stranded adeno-associated virus vector. Mol Ther, 19, 1961-70.

MOELLER, M. J., SANDEN, S. K., SOOFI, A., WIGGINS, R. C. & HOLZMAN, L. B. 2002. Two gene fragments that direct podocyte-specific expression in transgenic mice. J Am Soc Nephrol, 13, 1561-7.

PEROCHEAU, D. P. et al. Age-Related Seroprevalence of Antibodies Against AAV-LK03 in a UK Population Cohort. doi: 10.1089/hum.2018.098.

PICCONI, J. L., MUFF-LUETT, M. A., WU, D., BUNCHMAN, E., SCHAEFER, F. & BROPHY, P. D. 2014. Kidney-specific expression of GFP by in-utero delivery of pseudotyped adeno-associated virus 9. Molecular Therapy. Methods & Clinical Development, 1, 14014.

ROCCA, C. J., UR, S. N., HARRISON, F. & CHERQUI, S. 2014. rAAV9 combined with renal vein injection is optimal for kidney-targeted gene delivery: conclusion of a comparative study. Gene therapy, 21, 618-628.

SCHIEVENBUSCH, S., STRACK, I., SCHEFFLER, M., NISCHT, R., COUTELLE, O., HÖSEL, M., HALLEK, M., FRIES, J. W. U., DIENES, H. P., ODENTHAL, M. & BUNING, H. 2010. Combined Paracrine and Endocrine AAV9 mediated Expression of Hepatocyte Growth Factor for the Treatment of Renal Fibrosis. Molecular Therapy, 18, 1302-1309.

SCHAMBACH, A., BOHNE, J., BAUM, C., HERMANN, F. G., EGERER, L., VON LAER, D. & GIROGLOU, T. 2005. Woodchuck hepatitis virus post-transcriptional regulatory element deleted from X protein and promoter sequences enhances retroviral vector titer and expression. Gene Therapy, 13, 641.

VAN DER WOUDEN, E. A., SANDOVICI, M., HENNING, R. H., DE ZEEUW, D. & DEELMAN, L. E. 2004. Approaches and methods in gene therapy for kidney disease. J Pharmacol Toxicol Methods, 50, 13-24.

SEQUENCE LISTING FREE TEXT

[SEQ ID NO: 1] shows the ITR Forward primer.

[SEQ ID NO:2] shows the ITR Reverse primer.

[SEQ ID NO:3] shows the DNA sequence of the ITR probe FAM-5'-CACTCCCTCTCTGCGCGCTCG-3'-TAMRA.

[SEQ ID NO: 4] shows the example DNA sequence for the minimal human nephrin promoter (NPHS1) as shown in FIG. 5.

[SEQ ID NO:5] shows the example cDNA sequence for the human podocin transgene shown in FIG. 6.

[SEQ ID NO: 6] shows the example DNA sequence for the WPRE sequence shown in FIG. 7.

[SEQ ID NO:7] shows the example DNA sequence for the bGH poly(A) signal sequence shown in FIG. 8.

---

The invention claimed is:

1. A method of treating a monogenic form of nephrotic syndrome (NS), wherein the method comprises administering an adeno-associated virus (AAV) vector to a subject in need thereof, wherein the AAV vector comprises:
   a NS-associated transgene under the control of a podocyte-specific promoter;
   wherein the NS-associated transgene is NPHS2; ADCK4; ALG1; ARHGAP24; ARGHDIA; CD151; CD2AP; COQ2; COQ6; DGKE; E2F3; EMP2; KANK2; LAGE3; LMNA; LMX1B; MAFB; NUP85; NUP93; NXF5; OSGEP; PAX2; PDSS2; PMM2; PODXL; SCARB2; SGPL1; Smad7; TP53RK; TPRKB; VDR; WDR73; WT1; ZMPSTE24; or APOL1; and
   wherein the AAV vector is AAV serotype LK03 or 3B.

2. The method according to claim 1, wherein the AAV vector additionally comprises a Woodchuck hepatitis post-transcriptional regulatory element (WPRE).

3. The method according to claim 1, wherein the NS-associated transgene is human and/or comprises a hemagglutinin (HA) tag.

4. The method according to claim 1, wherein the AAV vector additionally comprises a Kozak sequence between the podocyte-specific promoter and the NS-associated transgene.

5. The method according to claim 1, wherein the AAV vector additionally comprises a polyadenylation signal.

6. The method according to claim 1, wherein the subject is a human patient.

7. The method according to claim 6, wherein the patient is a paediatric patient.

8. The method according to claim 1, wherein the monogenic form of nephrotic syndrome is a monogenic form of steroid-resistant nephrotic syndrome.

9. The method according to claim 1, wherein the AAV vector is administered systemically.

10. The method according to claim 1, wherein the AAV vector is administered by intravenous injection.

11. The method according to claim 1, wherein the AAV vector is administered by injection into the renal artery.

12. The method according to claim 1, wherein the podocyte-specific promoter is a minimal nephrin promoter or podocin promoter.

13. The method according to claim 5, wherein the polyadenylation signal is a bovine growth hormone (bGH) polyadenylation signal.

14. The method according to claim 1, wherein the NS-associated transgene is NPHS2.

15. The method according to claim 14, wherein the monogenic form of nephrotic syndrome is a monogenic form of steroid-resistant nephrotic syndrome caused by one or more mutations in NPHS2.

16. The method according to claim 1, wherein the AAV vector is AAV serotype LK03.

17. The method according to claim 12, wherein the podocyte-specific promoter is a minimal nephrin promoter.

* * * * *

SEQUENCE LISTING

```
<160> NUMBER OF SEQ ID NOS: 7

<210> SEQ ID NO 1
<211> LENGTH: 21
<212> TYPE: DNA
<213> ORGANISM: Artificial Sequence
<220> FEATURE:
<223> OTHER INFORMATION: ITR Forward primer

<400> SEQUENCE: 1
ggaaccccta gtgatggagt t                                             21

<210> SEQ ID NO 2
<211> LENGTH: 16
<212> TYPE: DNA
<213> ORGANISM: Artificial Sequence
<220> FEATURE:
<223> OTHER INFORMATION: ITR Reverse primer

<400> SEQUENCE: 2
cggcctcagt gagcga                                                   16
```

<210> SEQ ID NO 3
<211> LENGTH: 21
<212> TYPE: DNA
<213> ORGANISM: Artificial Sequence
<220> FEATURE:
<223> OTHER INFORMATION: ITR probe

<400> SEQUENCE: 3
cactccctct ctgcgcgctc g                                              21

<210> SEQ ID NO 4
<211> LENGTH: 1192
<212> TYPE: DNA
<213> ORGANISM: Homo sapiens

<400> SEQUENCE: 4
cacctgaggt caggagttcg agaccagcgt ggccaacatg atgaaacccc gtctctagta      60
aaaatacaaa aattagccag gcatggtgct atatacctgt agcaccagct acttgggaga     120
cagaggtggg agaattactt gaacctggga ggttcaagcc atgggaggtg gaagttgcag     180
tgagccgaga tgccactgca ctccagcctg agcaacagag caagactatc tcaagaaaag     240
aaagaaagaa agaaagagac ttgccaaggt catgtatcag ggcaaggaag agctgggggc     300
ccagctggct gctcccctgc tgagctggga gaccaccttg atctgacttc tcccatcttc     360
ccagcctaag ccaggccctg ggtcacggag gctggggag gcaccgagga acgcgcctgg     420
catgtgctga caggggattt tatgctccag ctgggccagc tgggaggagc ctgctgggca     480
gaggccagag ctgggggctc tggaaggtac ctggggggag ttgcactgtg agaatgagct     540
caagctgggt cagagagcag ggctgactct gccagtgcct gcatcagcct catcgctctc     600
ctaggctcct ggcctgctgg actctgggct gcaggtcctt cttgaaaggc tgtgagtagt     660
gagacaagga gcaggagtga ggggtggcag gagagaagat agagattgag agagagagag     720
agagagagac agagagagag gaagagacag agacaaaagg agagagaacg gcttagacaa     780
ggagagaaag atggaaagat aaagagactg ggcgcagtgg ctcacgcctg taatcccaac     840
acttggggag gccaaggtgg gaggatggct tgaaggaaag agtctgagat caacctggcc     900
aacatagtga gacccccgtct ctaaaaaaaa aagaaaaaaa aagaaaaaa gaaaaaaag     960 tttttttaaa gagacagaga aagagactca gagattgaga ctgagagcaa gacagagaga    1020
gatactcaca gggaagaggg gaagaggaaa acgagaaagg gaggagagta acggaaagag    1080
ataaaaaaga aaagcaggtg gcagagacac acagagaggg acccagagaa agccagacag    1140
acgcaggtgg ctggcagcgg gcgctgtggg ggtcacagta ggggggacctg tg           1192

<210> SEQ ID NO 5
<211> LENGTH: 1149
<212> TYPE: DNA
<213> ORGANISM: Homo sapiens

<400> SEQUENCE: 5
atggagagga gggcgcggag ctcctccagg gagtcccgcg ggcgaggcgg caggactccg      60
cacaaggaga acaagagggc aaaggccgag aggagcggcg gggccgcgg gcgccaggag     120 gctgggcccg agccgtcggg ctccggacgg gcggggaccc cggggagcc ccgagcgccc     180 gccgccacgg tggtggacgt ggatgaggtc cgaggctccg gcgaggaggg caccgaggtg     240
gtggcgctgt tggagagcga gcggcccgag gaaggtacca aatcctccgg cttagggggcc     300 tgtgagtggc ttcttgtcct catttccctg ctcttcatca tcatgaccttt ccttttttcc     360

```
atctggttct gcgtaaaggt tgtacaagag tatgaaagag taattatatt ccgactggga      420
catctgcttc ctggaagagc caaaggccct ggtcttttct ttttttttgcc ctgcctggat     480 acctaccaca aggttgacct tcgtctccaa actctggaga tacctttca tgagatcgtg       540 accaaagaca tgtttataat ggagatagat gccatttgct actaccgaat ggaaaatgcc     600
tctcttctcc taagcagtct tgctcatgta tctaaagctg tgcaattcct tgtgcaaacc      660
actatgaagc gtctcctagc acatcgatcc ctcactgaaa ttcttctaga gaggaagagc      720
atcgcccaag atgcaaaggt tgccttggat tcagtgacct gtatttgggg aatcaaagtg      780
gagagaatag aaattaaaga tgtgaggttg ccagctgggc ttcagcactc actggctgtg      840
gaggctgaag cgcaaagaca agccaaagtg cggatgattg ctgcagaagc ggaaaaggct      900
gcttctgagt ccctgaggat ggcagctgag attctgtcag caccctgc tgctgttcag        960 cttcgatacc tccacaccct tcagtctctg tccacagaga agccttccac tgtggtttta     1020
cctttgccat ttgacctact gaattgcctg tcttctccca gcaacagaac tcagggaagc     1080
ctccccttcc caagtcctc caaacctgtt gagccactaa atcctaaaaa gaaagactct     1140
cccatgtta                                                             1149

<210> SEQ ID NO 6
<211> LENGTH: 589
<212> TYPE: DNA
<213> ORGANISM: Woodchuck hepatitis virus

<400> SEQUENCE: 6
aatcaacctc tggattacaa aatttgtgaa agattgactg gtattcttaa ctatgttgct       60
ccttttacgc tatgtggata cgctgcttta atgcctttgt atcatgctat tgcttcccgt      120
atggctttca ttttctcctc cttgtataaa tcctggttgc tgtctcttta tgaggagttg      180
tggcccgttg tcaggcaacg tggcgtggtg tgcactgtgt tgctgacgc aaccccact       240 ggttggggca ttgccaccac ctgtcagctc ctttccggga cttttgcttt ccccctccct      300
attgccacgg cggaactcat cgccgcctgc cttgcccgct gctggacagg ggctcggctg      360
ttgggcactg acaattccgt ggtgttgtcg gggaaatcat cgtcctttcc ttggctgctc      420
gcctgtgttg ccacctggat tctgcgcggg acgtccttct gctacgtccc ttcggccctc      480
aatccagcgg accttccttc ccgcggcctg ctgccggctc tgcggcctct tccgcgtctt      540
cgccttcgcc ctcagacgag tcggatctcc ctttgggccg cctccccgc                 589

<210> SEQ ID NO 7
<211> LENGTH: 225
<212> TYPE: DNA
<213> ORGANISM: Artificial Sequence
<220> FEATURE:
<223> OTHER INFORMATION: bGH poly(A)

<400> SEQUENCE: 7
ctgtgccttc tagttgccag ccatctgttg tttgcccctc ccccgtgcct tccttgaccc       60
tggaaggtgc cactcccact gtcctttcct aataaaatga ggaaattgca tcgcattgtc      120
tgagtaggtg tcattctatt ctggggggtg ggtgggggca ggacagcaag ggggaggatt      180
gggaagacaa tagcaggcat gctggggatg cggtgggctc tatgg                     225
```